United States Patent [19]
Nakatsuji et al.

[11] Patent Number: 6,041,368
[45] Date of Patent: Mar. 21, 2000

[54] SYSTEM FOR OPERATING INPUT, PROCESSING AND OUTPUT UNITS IN PARALLEL AND USING DMA CIRCUIT FOR SUCCESSIVELY TRANSFERRING DATA THROUGH THE THREE UNITS VIA AN INTERNAL MEMORY

[75] Inventors: Fumio Nakatsuji, Kyoto; Toshinori Maeda, Neyagawa; Hiroshi Kamiyama, Uji, all of Japan

[73] Assignee: Matsushita Electric Industrial, Co., Japan

[21] Appl. No.: 09/053,966

[22] Filed: Apr. 2, 1998

[30] Foreign Application Priority Data

Apr. 2, 1997 [JP] Japan .................................. 9-083642

[51] Int. Cl.[7] .................................................. G06F 13/14
[52] U.S. Cl. ................................ 710/20; 710/21; 710/22; 710/40; 710/244; 714/746; 714/764; 714/785; 714/784; 714/781
[58] Field of Search .................................. 710/20, 21, 22, 710/40, 244; 714/746, 764, 785, 784, 781

[56] References Cited

U.S. PATENT DOCUMENTS

| 4,866,597 | 9/1989 | Kinoshita ............................. 364/200 |
| 5,243,581 | 9/1993 | Yuji et al. ............................. 369/32 |
| 5,497,344 | 3/1996 | Okamoto ............................. 395/800 |
| 5,530,901 | 6/1996 | Nitta ............................. 395/848 |
| 5,586,248 | 12/1996 | Alexander et al. ............................. 395/182.2 |
| 5,602,857 | 2/1997 | Zook et al. ............................. 371/40.1 |
| 5,604,753 | 2/1997 | Bauer et al. ............................. 371/40.1 |
| 5,661,848 | 8/1997 | Bonke et al. ............................. 395/439 |
| 5,765,187 | 6/1998 | Shimizu et al. ............................. 711/110 |
| 5,822,568 | 10/1998 | Swanstrom ............................. 395/500 |
| 5,831,999 | 11/1998 | Yamamura ............................. 371/37.4 |
| 5,857,114 | 1/1999 | Kim ............................. 395/842 |

FOREIGN PATENT DOCUMENTS

WO92/15054 9/1992 WIPO ............................. G06F 3/06

*Primary Examiner*—Thomas C. Lee
*Assistant Examiner*—Twanna Gossom
*Attorney, Agent, or Firm*—Price, Gess & Ubell

[57] ABSTRACT

A data input-output device includes a single memory, an input interface unit for storing data in the memory, an operation unit for fetching the data from the memory, for performing operations on the data, and for updating the data in the memory when necessary, an output interface unit for transmitting the data in the memory that has been operated on by the operation unit to outside of the device, and a bus control unit for setting a priority for each of these units and for controlling memory access by these units according to the priorities every time a predetermined number of bytes of data is transferred.

14 Claims, 24 Drawing Sheets

PRIOR ART

FIG. 12

| BLOCK NUMBER | CONDITION |
| --- | --- |
| 1 | OUTPUTTABLE |
| 2 | ERROR-CORRECTABLE |
| 3 | INPUTTABLE |
| | |
| | |
| 15 | INPUTTABLE |

SYSTEM FOR OPERATING INPUT, PROCESSING AND OUTPUT UNITS IN PARALLEL AND USING DMA CIRCUIT FOR SUCCESSIVELY TRANSFERRING DATA THROUGH THE THREE UNITS VIA AN INTERNAL MEMORY

BACKGROUND OF THE INVENTION (1) Field of the Invention

The present invention relates to a data input-output device, and especially relates to a data input-output device that outputs input data after performing specific operations on the data, where data is input and output at a respectively predetermined transmission rates.

(2) Description of the Prior Art

A data input-output device needs to be provided in a computer or audiovisual equipment in order to use digital data stored on an optical disc or a magnetic disk.

The data input-output device reads data stored on an optical disc and manipulates or corrects the data as necessary, and transmits the data to a computer after converting the format of the data so that the data may be used by the computer.

(Optical disc Reader)

The following is the explanation of the above-mentioned example of a data input-output device, that is, a conventional optical disc reader in accordance with FIGS. 1 to 5.

FIG. 1 shows the overall construction of a conventional optical disc reader.

Optical disc reader 1000 roads data recorded on optical disc 1010, and transmits the data to host computer 1070 after correcting any errors in the fetched data. Optical disc reader includes pickup 1020, amplifier 1030, front end processor 1040, optical disc control unit 1100, rotation motor 1050, servo controller 1060, and system control unit 1200.

System control unit 1200 is a microprocessor that interprets a command to obtain data, the command having been received from host computer 1070 via optical disc control unit 1100, and executes the command by controlling servo controller 1060 and optical disc control unit 1100.

Rotation motor 1050 rotates optical disc 1010. On receiving the instructions from system control unit 1200, servo controller 1060 controls the rotation of rotation motor 1050 and the lens position in pickup 1020 according to the information from front end processor 1040.

Pickup 1020 reads data recorded on optical disc 1010 by directing a laser beam at the optical disc and transforming reflected light into electrical signals. Amplifier 1030 amplifies the signals output by pickup 1020 and outputs the signals to front end processor 1040.

Front end processor 1040 performs feedback control of servo controller 1060, rotation motor 1050, and pickup 1020 according to the input signals to output stable signals to optical disc control unit 1100. Front end processor 1040, which includes an equalizer, an AGC (automatic gain control), and a PLL (phase-locked loop), outputs signals, that is, modulated data, to optical disc control unit 1100.

Optical disc control unit 1100 informs the system control unit 1200 of a command to obtain data that was issued by host computer 1070. Under the control of system control unit 1200, optical disc control unit 1100 demodulates the signals input from front end processor 1040 to obtain the requested data, and transmits the data to host computer 1070 after performing an error correction process on it.

The bold lines in FIG. 1 show the data flow from optical disc 1010 to host computer 1070. The data recorded on optical disc 1010 is transmitted to host computer 1070 via pickup 1020, amplifier 1030, front end processor 1040, and optical disc control unit 1100.

The following is a detailed explanation of optical disc control unit 1100 in a conventional optical disc reader in accordance with FIG. 2.

FIG. 2 shows the construction of optical disc control unit 1100 in a conventional optical disc reader.

Optical disc control unit 1100 includes first memory 1110, second memory 1120, third memory 1130, disk interface unit 1140, error correction unit 1150, host interface unit 1160, first transfer unit 1170, and second transfer unit 1180.

The bold lines in FIG. 2 show the data flow from front end processor 1040 to host computer 1070.

Disk interface unit 1140 demodulates the signals input from front end processor 1040 to obtain the requested data, and stores the data in first memory 1110.

Error correction unit 1150 performs an error correction process on a predetermined number of bytes of data that disk interface unit 1140 stores in first memory 1110, and corrects the data when necessary. The above-mentioned predetermined number of bytes of data is the amount of data included in one block of data, that is, the processing unit on which an error correction process is performed. Hereinafter, this predetermined number of bytes of data will be called a block of data. The error correction process performed by error correction unit 1150 will be explained later in detail.

First transfer unit 1170 transfers data which has been subjected to the error correction process by error correction unit 1150 and stored in first memory 1110 to second memory 1120.

First memory 1110 has a capacity of one megabit and includes three areas which each can store one block of data.

Disk interface 1140, error correction unit 1150, and first transfer unit 1170 operate independently. Each of the three areas is accessed by one of disk interface unit 1140, error correction unit 1150, and first transfer unit 1170 simultaneously in a fixed interval. The area accessed by disk interface unit 1140 is accessed by error correction unit 1150 in the next interval. The area accessed by error correction unit 1150 is accessed by first transfer unit 1170 in the next interval. The area accessed by first transfer unit 1170 is accessed by disk interface unit 1140 in the next interval.

In terms of memory access, this means that first memory 1110, as a whole, is simultaneously accessed by three different units, disk interface unit 1140, error correction unit 1150, and first transfer unit 1170 and so needs to be constructed to allow such simultaneous access.

In terms of each block this means that disk interface unit 1140 first stores one block of data in first memory 1110, secondly error correction unit 1150 performs an error correction process on the data, and thirdly first transfer unit 1170 transfers the data to second memory 1120.

Second memory 1120 stores the data transferred from first transfer unit 1170, with the data then being transferred to third memory by second transfer unit 1180.

Third memory 1130 is a four megabit memory which stores up to 15 blocks or data. Third memory 1130 stores the data transferred from an optical disc via first memory 1110 and second memory 1170.

Host interface unit 1160 transfers the data transfer command from host computer 1070 to system control unit 1200, and transmits the data stored in third memory 1130 to host computer 1070 on the instructions from system control unit 1200.

System control unit 1200 manages the data stored in third memory 1130, and when host computer 1070 requests the transmission of the data not stored in third memory 1130, drives rotation motor 1040 via servo controller 1060 to transmit to host computer 1070 the data transferred to third memory 1130 by controlling host interface unit 1160.

The components of conventional optical disc control unit 1100 can be broadly classified into two parts: one part, the core unit of which is first memory 1110, reads data and performs the error correction process; and the other part, the core unit of which is third memory 1130, transmits data to host computer 1070. Second memory 1120 connects these two parts as a FIFO (first-in first-out) buffer.

Data is input from front end processor 1040 to disk interface unit 1140 at low speed. On the other hand, data needs to be output from host interface unit 1160 to host computer 1070 at high speed in order not to delay the process performed in host computer 1070. Therefore, conventional optical disc control unit 1100 has a construction where the low speed processing part and the high speed processing part are connected with a buffer.

(Error Correction Unit)

The following is the detailed explanation of error correction unit 1150 included in optical disc control unit 1100 in conventional optical disc reader 1000 mentioned above.

First of all, the error correction process performed by error correction unit 1150 is explained.

The recording density of a recording medium, such as an optical disc which records digital data, is so high that even a tiny crack in the medium, fine dirt, and fine dust can easily cause data errors. Therefore, a reader such as an optical disc reader may not always read data correctly.

In order to read data correctly, the error correction process is performed. An error-correcting code is added to a piece of data when the data is recorded on a recording medium, and the reader of the recording medium detects and corrects erroneous data using the error-correcting code. A Reed-Solomon code is an error-correcting code that is very effective at correcting erroneous data.

FIG. 3 shows an example of an error-correcting code. This example is a product code which is the most fundamental code that can be produced by combining two codes.

In C1 direction k1 bytes of parity data is added to n1xn2 bytes of information data 1311, and k2 bytes of parity data is added in C2 direction. k2 bytes of parity data is added to C1 parity data in C2 direction.

Therefore, k1xn2 bytes of parity data 1312, n1xk2 bytes of parity data 1313, and k1xk2 bytes of parity data 1314 is added to information data 1311. Consequently, (n1+k1)×(n2+k2) bytes of data forms one block of data, that is, the processing unit on which an error correction process is performed.

The error correction process is performed on the product code shown in FIG. 3 in the following manner. Firstly, an error correction process is performed on n1 bytes of information data in each row from the first row to the (n2+k2)th row using the k1bytes of parity data in C1 direction. This will correct errors included in the information data to some extent. Secondly, an error correction process is performed on n2bytes of information data in each column from the first column to the (n1+k1)th column using the parity data in C2 direction in order to increase the accuracy of the information data. Thirdly, additional error correction calculations performed using the parity data in C1 direction further increase the accuracy of the information data.

The error correction process using the parity data in C1 direction on the first row of the information data is performed in the following process.

(1) A syndrome is calculated from one row of information data and parity data. When the value of a multidimensional syndrome is "0", that is, the value of each component of the syndrome is "0", no error is included in the row of information data.

(2) An error position polynomial and an error value polynomial are calculated based on the syndrome by a method such as Euclid's algorithm.

(3) The root of the error position polynomial is calculated by a method such as chain retrieval.

(4) The error value is calculated and the value of the information data at the error position is corrected to the result of an exclusive OR operation performed on the value of information data at the error position and the error value.

The construction of error correction unit 1150 is explained below in accordance with FIG. 4.

FIG. 4 shows the construction of conventional error correction unit 1150.

Error correction unit 1150 includes syndrome calculation circuit 1151, Euclidean calculation circuit 1152, chain calculation circuit 1153, and erroneous data correction circuit 1154.

Syndrome calculation circuit 1151 performs operation (1) in the above-mentioned process. Euclidean calculation circuit 1152 performs operation (2), chain calculation circuit 1153 performs operation (3), and erroneous data correction circuit 1154 performs their operation (4). These circuits synchronize their operations with each other and perform the operations in parallel. Consequently, these circuits perform serial processing in a pipelined architecture.

The bold lines in FIG. 4 show the flow of the data to and from first memory 1110.

Syndrome calculation circuit 1151 fetches the data stored in first memory 1110 to perform a calculation, and transfers the result of the calculation to Euclidean calculation circuit 1152. Euclidean calculation circuit 1152 transfers its calculation result to chain calculation circuit 1153. Chain calculation circuit 1153 transfers its calculation result to erroneous data correction circuit 1154. Erroneous data correction circuit 1154 calculates the value of the error included in the data, performs an exclusive OR operation on the error value and the value of the information data at the error position stored in first memory 1110, and overwrites the result of the exclusive OR operation over the value of the information data. Erroneous data correction circuit 1154 then updates the information data stored in first memory 1110.

FIG. 5 shows the parallel processing performed in conventional error correction unit 1150.

No. 1, or No. 2 in FIG. 5 shows a coded data sequence, for instance, one row of information data to which the parity data in C1 direction is added as mentioned above. Each of the data sequences is a block-coded "codeword", which is called a "received word" when received via a channel. The above-mentioned block coding is a coding performed on one set of data, for instance, one row of data, independently of the coding performed on other sets of data, which is to say, other rows of data. The channel mentioned above is the path, which includes pickup 1020 and the like, by which the data recorded on an optical disc is read and transferred to optical disc control unit 1100.

The lengths of the bold lines in FIG. 5 show the time taken to perform each task.

FIG. 5 shows that each circuit performs calculation on a different data sequence in each period of time, and that no two circuits perform calculation on the same data sequence in any one period of time. For instance, syndrome calculation circuit 1151 calculates data sequence No. 4 in time t4, and calculates data sequence No. 5 in time t5. Euclidean calculation circuit 1152 calculates data sequence No. 3, and chain calculation circuit 1153 calculates data sequence No. 2, and erroneous data correction circuit 1154 calculates data sequence No. 1, in time t4.

Each period of time, such as t1 or t2, is set at the longest processing time of the four circuits in order that the four circuits perform serial processing in a pipelined architecture.

More specifically, the time taken by the processing of each circuit is different as shown by the bold lines in FIG. 5, so that for serial processing in a pipeline architecture to be possible, appropriate wait times need to be set for the various circuits. Generally speaking, the time for the calculation performed in the Euclidean calculation circuit is longer than that in the syndrome calculation circuit, the chain calculation circuit, or the erroneous data correction circuit.

The optical disc reader, which has been explained above as an example of a conventional data input output device, has the problems described below.

Firstly, two memories that store the same data, for instance, the first memory and the third memory in optical disc control unit 1100, are include din the conventional data input-output device. This is because the data transmission rates for inputting data and outputting data are different. This is also because a structure where the same unit is in charge of the calculations of the input data and the high speed output of the data would require complicated memory access control. It is undesirable to inefficiently use a memory, such as the first memory in optical disc control unit 1100, in a data input-output device.

Secondly, the serial processing in a pipelined architecture performed by the four circuits in error correction unit 1150 generates the waiting time for all the circuits except the circuit requiring the longest processing time.

These days an increasing number of consumers are demanding electric appliances and information equipment that are more compact and have higher performance. Under the circumstances, solving the above-mentioned problems of ineffective memory and futile waiting time has direct and indirect effects on the realization of compactness and higher performance.

SUMMARY OF THE INVENTION

It is accordingly an object of the present invention to provide a data input-output device that does not need to include different memories for storing data input at a first transmission rate and data to be output at a second transmission rate.

Another object of the present invention is to provide a data input-output device that outputs data after performing an error correction process on the input data without ineffective waiting time.

The above-mentioned first object is achieved by a data input-output device that performs operations on data input from a first device located outside thereof, and outputs the data to a second device located outside thereof including: an input unit for continually receiving data from the first device; an operation unit for performing an operation on the data; an output unit for outputting the data to the second device; a memory for storing the data; a memory bus for connecting the input unit, the operation unit, and the output unit with the memory; a first data transfer unit for performing first DMA (direct memory access) transfer which transfers the data from the input unit to the memory; a second data transfer unit for performing second DMA transfer which, when the first data transfer unit has completed the first DMA transfer for a first predetermined amount of data, transfers the data that was stored by the first DMA transfer from an area in the memory to the operation unit as the data for the operation; a third data transfer unit for performing third DMA transfer which, when the operation unit has completed the operation for the first predetermined amount of data, transfers the data operated on by the operation unit from the area in the memory to the output unit; and a data transfer control unit for performing control so that at any given time, data transfer is performed by the first data transfer unit, the second data transfer unit, or the third data transfer unit, wherein the input unit, the operation unit, and the output unit operate independently in parallel.

In the data input-output device, the data transfer control unit has one of the first DMA transfer, the second DMA transfer, and the third DMA transfer performed exclusively. In the data input-output device, a series of processes for receiving the data that is continually input, performing an operation on the data, and outputting the data is performed with only one memory.

Here, when one of the first DMA transfer, the second DMA transfer, and the third DMA transfer becomes necessary for a second predetermined amount of data, the data transfer control unit may have the first data transfer unit, the second data transfer unit, or the third data transfer unit continually transfer the second predetermined amount of data in accordance with which of the first DMA transfer, the second DMA transfer, and the third DMA transfer needs to be performed, and when at least two of the first DMA transfer, the second DMA transfer, and the third DMA transfer become simultaneously necessary, the data transfer control unit may have the first data transfer unit, the second data transfer unit, or the third data transfer unit which needs to perform DMA transfer continually transfer the second predetermined amount of data in accordance with predetermined priority rankings for the first data transfer unit, the second data transfer unit, and the third data transfer unit.

The data input-output device controls the memory access according to the priority rankings. As a result, when the transfer rate at which data is input into the data input-output device from an external device and the transfer rate required by another external device to which the data input-output device outputs its data are set at predetermined rates, such as those stipulated by standards, the data input-output device is able to perform appropriate control in accordance with the requirements of these standards. This is to say, the data input-output device of the stated construction can set the priority of data with a requested transfer rate at a high value, and thereby can immediately respond to the need to transfer such data.

The data input-output device performs data transfer collectively in units of the second predetermined amount, which acts to increase the memory access rate per unit of data and makes it easier for the data input-output device to achieve the required transmission rates mentioned above.

The memory may be a dynamic memory, and the second predetermined amount of data may be set at a number of bytes so that a formula $tv(n+2)<1$ is satisfied, in which time taken for memory access per byte is t seconds when DMA transfer is continually performed to or from the memory for the second predetermined amount of data, in which an average transfer rate from the first device to the input unit is v bytes/second, and in which a number of times the second DMA transfer needs to be performed for a piece of data is n.

The data input-output device can prevent the overflow of data even if data is input continually.

The input unit may include a first FIFO memory for temporarily storing data received from the first device, the output unit may include a second FIFO memory for temporarily storing data to be output to the second device, the first data transfer unit may transfer data from the first FIFO memory in the input unit in the first DMA transfer, the third data transfer unit may transfer data to the second FIFO memory in the output unit in the third DMA transfer, the first DMA transfer may become necessary when the second predetermined amount of data has been accumulated in the first FIFO memory, and the third DMA transfer may become necessary when the second predetermined amount of data on which the operation has been performed by the operation unit is stored in the memory and the second FIFO memory has enough space to store the second predetermined amount of data.

With the present construction, even if the device is unable to immediately respond to the need to perform the first DMA transfer or the third DMA transfer due to a present execution of memory access for a data transfer, the FIFOs can ensure that none of the input data will be lost and that there will be no interruptions to the output of data. In other words, a data input-output device can be realized where it is ensured that data which is being continuously input from an external device can be received and output to another external device at a required transfer rate.

In the predetermined priority rankings, the first DMA transfer by the first data transfer unit may have a highest priority, when the first DMA transfer becomes necessary but DMA transfer is already being performed by the first data transfer unit, the second data transfer unit, or the third data transfer unit, the data transfer control unit may have the first data transfer unit perform the first DMA transfer only after the presently performed DMA transfer has been completed for the second predetermined amount of data, and when the first DMA transfer becomes necessary but no DMA transfer is being performed by any of the first data transfer unit, the second data transfer unit, and the third data transfer unit, the data transfer control unit may have the first data transfer unit immediately perform the first DMA transfer, and the second predetermined amount of data may be set at a number of bytes so that a formula m/v>T is satisfied, in which the first FIFO memory has a capacity of m bytes, in which an average transfer rate from the first device to the input unit is v bytes/second, and in which time taken for memory access when DMA transfer is continually performed to or from the memory for the second predetermined amount of data is T seconds.

With the above construction, the data input-output device can immediately store continuously input data in the memory, so that no received data is lost.

In the predetermined priority rankings, the second DMA transfer by the second data transfer unit may have a lower priority than the first DMA transfer by the first data transfer unit and the third DMA transfer by the third data transfer unit, and the data transfer control unit may have the second data transfer unit perform the second DMA transfer only when none of the first DMA transfer and the third DMA transfer is necessary.

The data input-output device is constructed so that the DMA transfer for the operation is performed in the intervals between the DMA transfer from the input unit to the memory and the DMA transfer from the memory to the output unit. As a result, the data input-output device is still able to operate favorably even when the transmission rates in inputting and outputting data are fixed.

The data which the input unit receives from the first device may include error correction codes, the operation may be an error correction process, the operation unit may access the memory via the second data transfer unit to perform the error correction process, and may refer to and may update the data stored in the memory according to the error correction codes, and the data transfer control unit may allow the operation unit ot access the memory for the error correction process only when none of the first data transfer unit, the second data transfer unit, and the third data transfer unit are performing DMA transfer.

The stated construction realizes a data input-output device which performs data correction on input data and outputs the data.

The first device may read data on an optical disc, the optical disc may record data which has been coded by calculating a product code for a third predetermined amount of data that is larger than the second predetermined amount of data, and the memory may have a capacity to store at least two times the third predetermined bytes of data.

The stated construction realizes a data input-output device that performs data correction on data read from an optical disc and outputs the data.

The operation unit may include: a syndrome calculation unit for continually and repeatedly performing a syndrome calculation process in which, on receiving a predetermined fourth amount of data, the syndrome calculation unit calculates a syndrome for the predetermined fourth amount of data; a syndrome storage queue which has a space for storing a plurality of syndromes; a syndrome storage unit for storing each syndrome calculated by the syndrome calculation unit in the syndrome storage queue; and a correction unit that, when the syndrome storage queue stores at least one syndrome, fetches one syndrome from the syndrome storage queue, and corrects data corresponding to the fetched syndrome based on the fetched syndrome only when a value of the fetched syndrome is not "0", and the syndrome calculation unit and the correction unit may operate in parallel.

With the stated construction, the data input-output device performs the syndrome calculation at a processing speed that is unaffected by the other operations in the error correction process. Unlike conventional error correction processes, it is unnecessary for the data input-output device to have the syndrome calculation and the Euclidean calculation performed at a uniform processing speed, so that the processing speed of the error correction process as a whole can be increased.

In more detail, by executing the syndrome calculation and the remaining operations in the error correction process in parallel, the time required by the error correction process as a whole becomes almost equal to the time required for the syndrome calculation, so that a data input-output device that performs the error correction process at high speed can be realized.

Consequently, the data input-output device with the above construction can achieve both of the above-mentioned first and second objects. By achieving both objects, a data input output device that is compact and works at high speed is realized.

The correction unit may include: a polynomial calculation unit for calculating an error position polynomial and an error value polynomial based on the fetched syndrome; an error position calculation unit for calculating an error position that is a root of the error position polynomial calculated by the polynomial calculation unit; and a data correction unit for calculating an error value based on the error value polynomial calculated by the polynomial calculation unit and the error position calculated by the error position calculation unit, and for correcting data stored in the memory based on the calculated error value and the error position, and the error position calculation unit and the polynomial calculation unit or the data correction unit may operated in parallel.

With the stated construction, in the error correction processing aside from the syndrome calculation, the calculation of the error position for a given data sequence and the calculation of the error position polynomial and the error value polynomial for another data sequence can be performed at the same time, so that the time taken by the error correction process as a whole is little more than the time taken by the syndrome calculation. As a result, an error correction device that performs the error correction process at high speed is realized.

The above-mentioned second object is achieved by an error correction device that continually performs an error correction process on each of a plurality of received words that are block-coded codewords, including: a syndrome calculation unit for successively obtaining each of the plurality of received words, and for continually performing a syndrome calculation process in which a syndrome corresponding to a received word is calculated based on the received word; a syndrome storage queue which has a space for storing a plurality of syndromes; a syndrome storage unit for storing each syndrome calculated by the syndrome calculation unit in the syndrome storage queue; and a correction unit which, when the syndrome storage queue stores at least one syndrome, fetches one syndrome from the syndrome storage queue, and performs the error correction process on a received word corresponding to the fetched syndrome based on the fetched syndrome only when a value of the fetched syndrome is not "0", wherein the syndrome calculation unit and the correction unit operate in parallel.

With the stated construction, the data input-output device performs the syndrome calculation at a processing speed that is unaffected by the other operations in the error correction process, so that a uniform processing speed does not need to be used for the syndrome calculation and the Euclidean calculation. Accordingly, even if the syndrome calculation for a data sequence takes longer than the Euclidean calculation, a data input-output device with a high overall processing speed for the error correction process is still realized.

In more detail, by executing the syndrome calculation and the remaining operations in the error correction process in parallel, the time required by the error correction process as a whole becomes almost equal to the time required for the syndrome calculation, so that a data input-output device that performs the error correction process at high speed can be realized.

The error correction device may further include a received work storage unit for storing the plurality of received words to be received by the syndrome calculation unit, wherein the correction unit performs the error correction process by updating a received word stored in the received word storage unit.

An error correction device that performs the error correction process on a plurality of received words stored in the memory at high speed is realized.

The correction unit may include: a polynomial calculation unit for calculating an error position polynomial and an error value polynomial based on the syndrome; an error position calculation unit for calculating an error position that is a root of the error position polynomial calculated by the polynomial calculation unit; and a data correction unit for calculating an error value based on the error value polynomial calculated by the polynomial calculation unit and the error position calculated by the error position calculation unit, and for correcting data included in the received word based on the calculated error value and the error position, and the error position calculation unit and the polynomial calculation unit or the data correction unit may operated in parallel.

The error correction device calculates the error position of one data sequence in parallel with the calculation of the error position polynomial and the error value polynomial of another data sequence in the error correction operations mother than the syndrome calculation. As a result, the time taken to perform the whole error correction process is little more than the time taken to perform the syndrome calculation. Accordingly, an error correction device that performs the error correction process at high speed is realized.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 12 shows memory management information;

DESCRIPTION OF THE PREFERRED EMBODIMENT

The following is an explanation of an optical disc reader, that is, a data input-output device according to the embodiment in the present invention.

(Optical Disc Reader)

Figure 6:
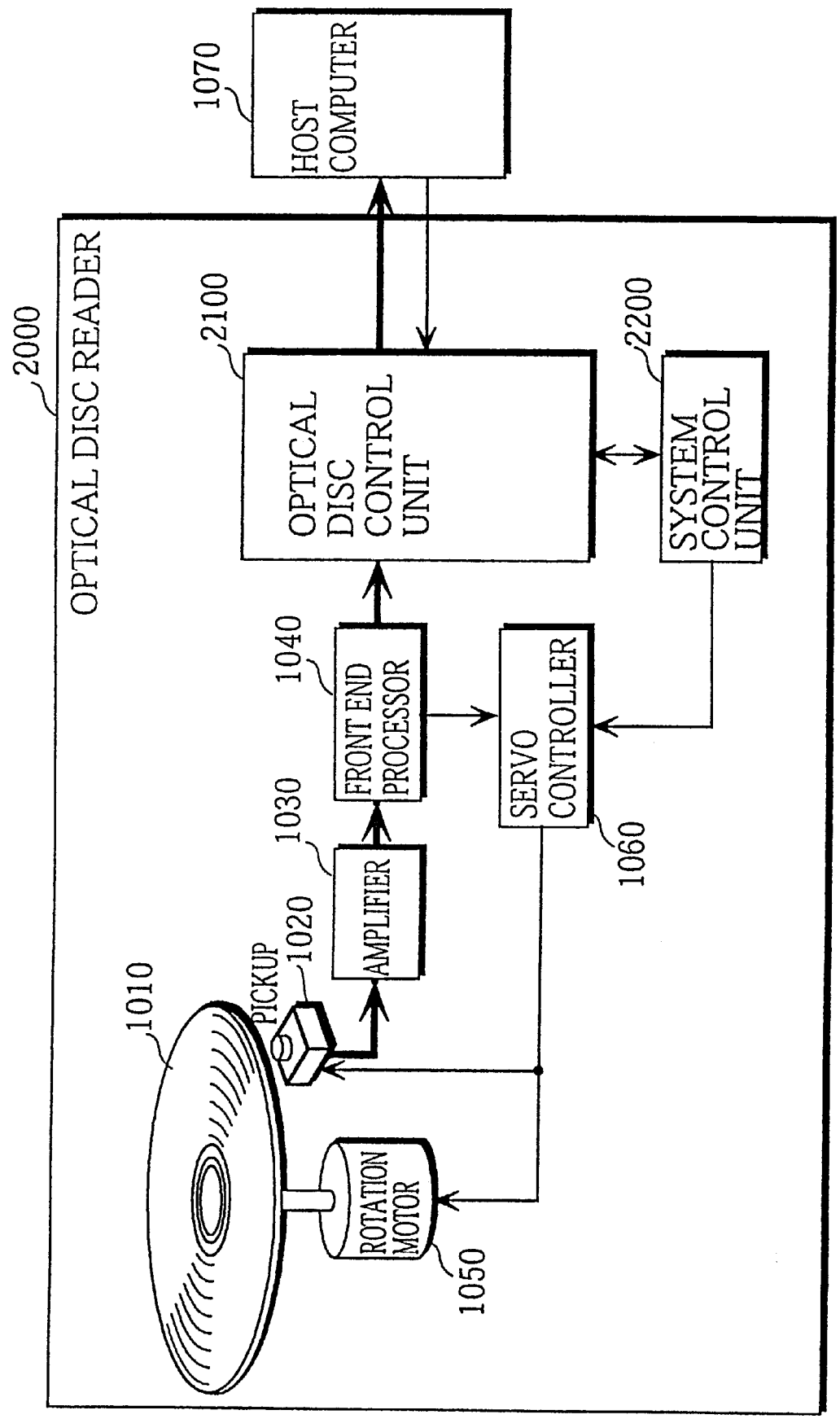
FIG. 6 shows an overall construction of an optical disc reader according to the embodiment of the present invention.

FIG. 6 shows an overall construction of an optical disc reader according to the embodiment of the present invention.

Optical disc reader 2000 reads data recorded on optical disc 1010, and transmits the read-out data to host computer 1070 after performing an error correction process. Optical disc reader 2000 includes pickup 1020, amplifier 1030, front end processor 1040, optical disc control unit 2100, rotation motor 1050, servo controller 1060, and system control unit 2200.

Figure 1:
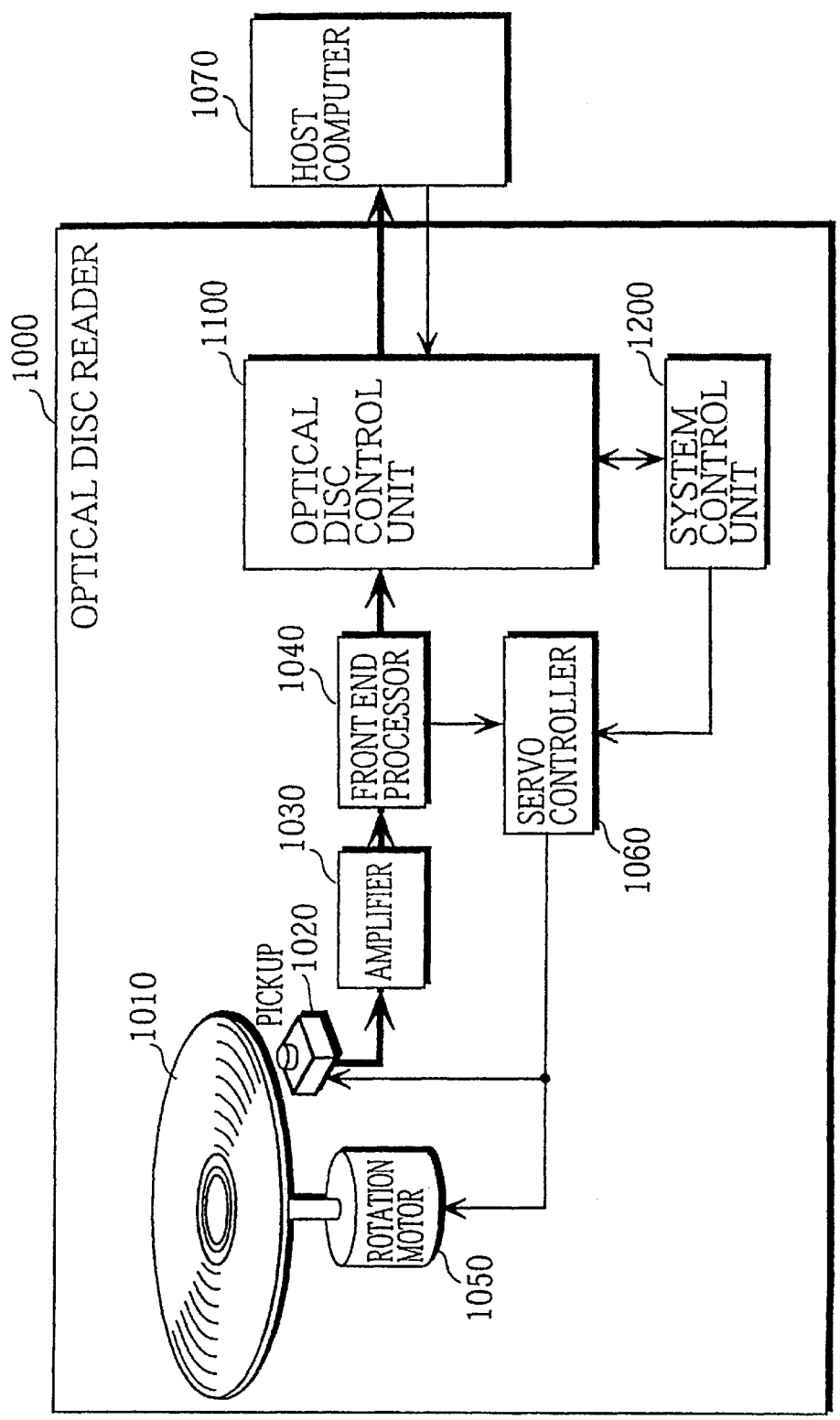
FIG. 1 shows an overall construction of a conventional optical disc reader.
Figure 2:
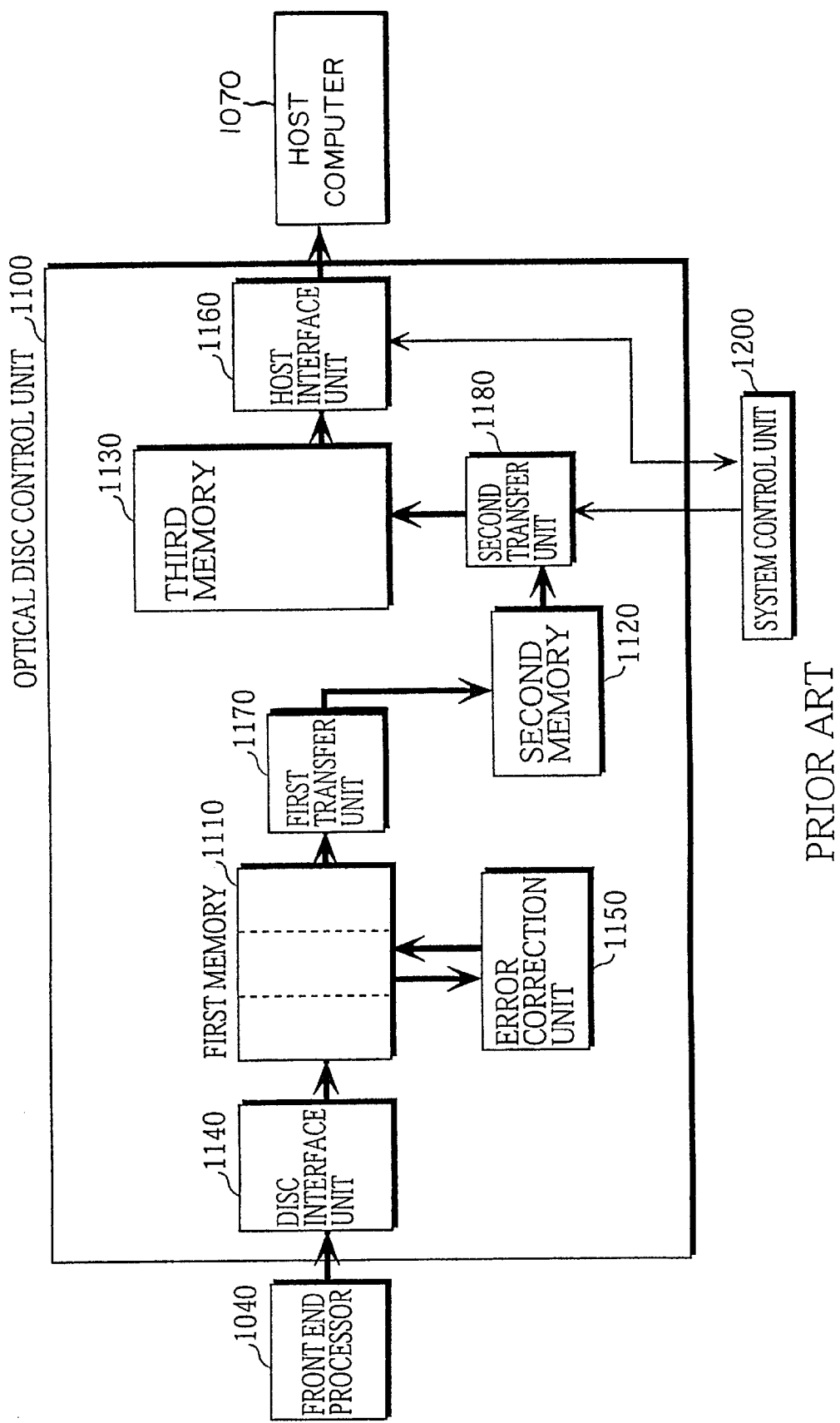
FIG. 2 shows a construction of conventional optical disc control unit 1100.

The optical disc reader according to the embodiment of the present invention includes the same components as the conventional optical disc reader except optical disc control unit 2100 and system control unit 2200. The remaining components have been given the same reference numbers as FIG. 1.

Optical disc 1010 is a DVD-ROM (digital video disc read only memory).

System control unit 2200 is a microprocessor which interprets a data transfer command received from host computer 1070 via optical disc control unit 2100, and responds to the command by controlling servo controller 1060 and optical disc control unit 2100.

Rotation motor 1050 rotates optical disc 1010. On receiving the instructions from system control unit 2200, servo controller 1060 controls the rotation of rotation motor 1050 and the lens position of pickup 1020 according to the information from front end processor 1040.

Pickup 1020 reads data recorded on optical disc 1010 by directing a laser beam at the optical disc and transforming the reflected light into electrical signals. Amplifier 1030 amplifies the signals output by pickup 1020 and outputs the signals to front end processor 1040.

Front end processor 1040 performs feedback control of servo controller 1060, rotation motor 1050, and pickup 1020 according to the input signals to output stable signals to optical disc control unit 2100. Front end processor 1040 includes an equalizer, an AGC (automatic gain control), and a PLL (phase-locked loop).

Optical disc control unit 2100 informs system control unit 2200 of a command to obtain data that is issued by host computer 1070. Under the control of system control unit 2200, optical disc control unit 2100 demodulates the signals input from front end processor 1040 to obtain the requested data, and transmits the data to host computer 1070 after performing an error correction process. Optical disc control unit 2100 differs from optical disc control unit 1100 in the internal structure and the operations described later.

The bold lines in FIG. 6 show the data flow from optical disc 1010 to host computer 1070. The data recorded on optical disc 1010 is transmitted to host computer 1070 via pickup 1020, amplifier 1030, front end processor 1040, and optical disc control unit 2100.

The following is the detailed explanation of optical disc control unit 2100.

Figure 7:
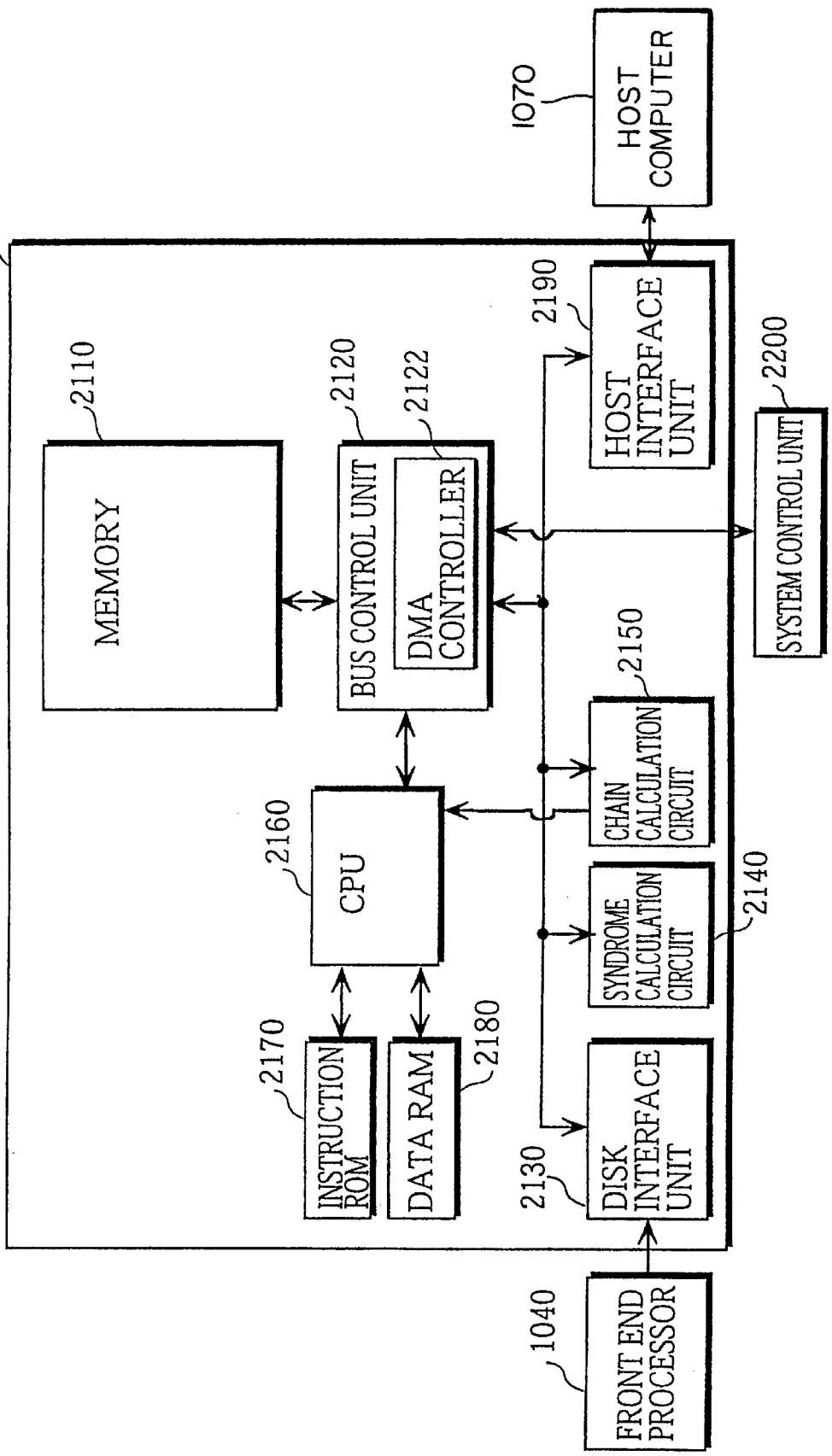
FIG. 7 shows a structure of optical disc control unit 2100.

FIG. 7 shows the structure of optical disc control unit 2100.

Optical disc control unit 2100 includes memory 2110, bus control unit 2120, disc interface unit 2130, syndrome calculation circuit 2140, chain calculation circuit 2150, CPU 2160, instruction ROM (read only memory) 2170, data RAM (random access memory) 2180, and host interface unit 2190.

Memory 2110 is a four megabit dynamic memory which stores up to 15 blocks of data. Memory 2110 has a large enough capacity to be used as a disk cache when the data stored there is requested again, although the use of memory for disk caching has no particular bearing on the present invention.

Disk interface unit 2130 demodulates the signal input from front end processor 1040 to obtain the requested data which it transfers to memory 2110 via bus control unit 2120. Disk interface unit 2130 includes a FIFO memory, the total storage capacity of which is at least eight bytes.

Syndrome calculation circuit 2140 performs operation (1) described in the prior art section. Syndrome calculation circuit 2140 fetches the data stored in memory 2110 via bus control unit 2120 and performs a syndrome calculation on the data.

Chain calculation circuit 2150 performs operation (3) described above, that is, inputs an error position polynomial and outputs the root of the error position polynomial.

CPU 2160 controls the overall data processing performed in optical disc control unit 2100. CPU 2160 interprets and executes the program stored in instruction ROM 2170, and uses RAM 2180 for storing the data when executing the program. In addition, CPU 2160 performs operations (2) and (4) in the error correction process described above.

Host interface unit 2190 fetches the data on which the error correction process has been performed from memory 2110 via bus control unit 2120, and transmits the data to host computer 1070. Host interface unit 2190 includes a FIFO memory, the total storage capacity of which is at least eight bytes.

Disk interface unit 2130, syndrome calculation circuit 2140, host interface unit 2190, and chain calculation circuit 2150 are connected by a bus.

Bus control unit 2120 controls the use of the buses, especially, the memory bus to control the access to memory 2110. Bus control unit 2120 includes DMA (direct memory access) controller 2122.

DMA controller 2122 controls three independent data transfers. Here, the data transfer control structures for these data transfers will be referred to as the first channel, the second channel, and the third channel of the DMA controller, with the data transfers being referred to as DMA transfer by the first channel, DMA transfer by the second channel, and DMA transfer by the third channel.

Figure 8:
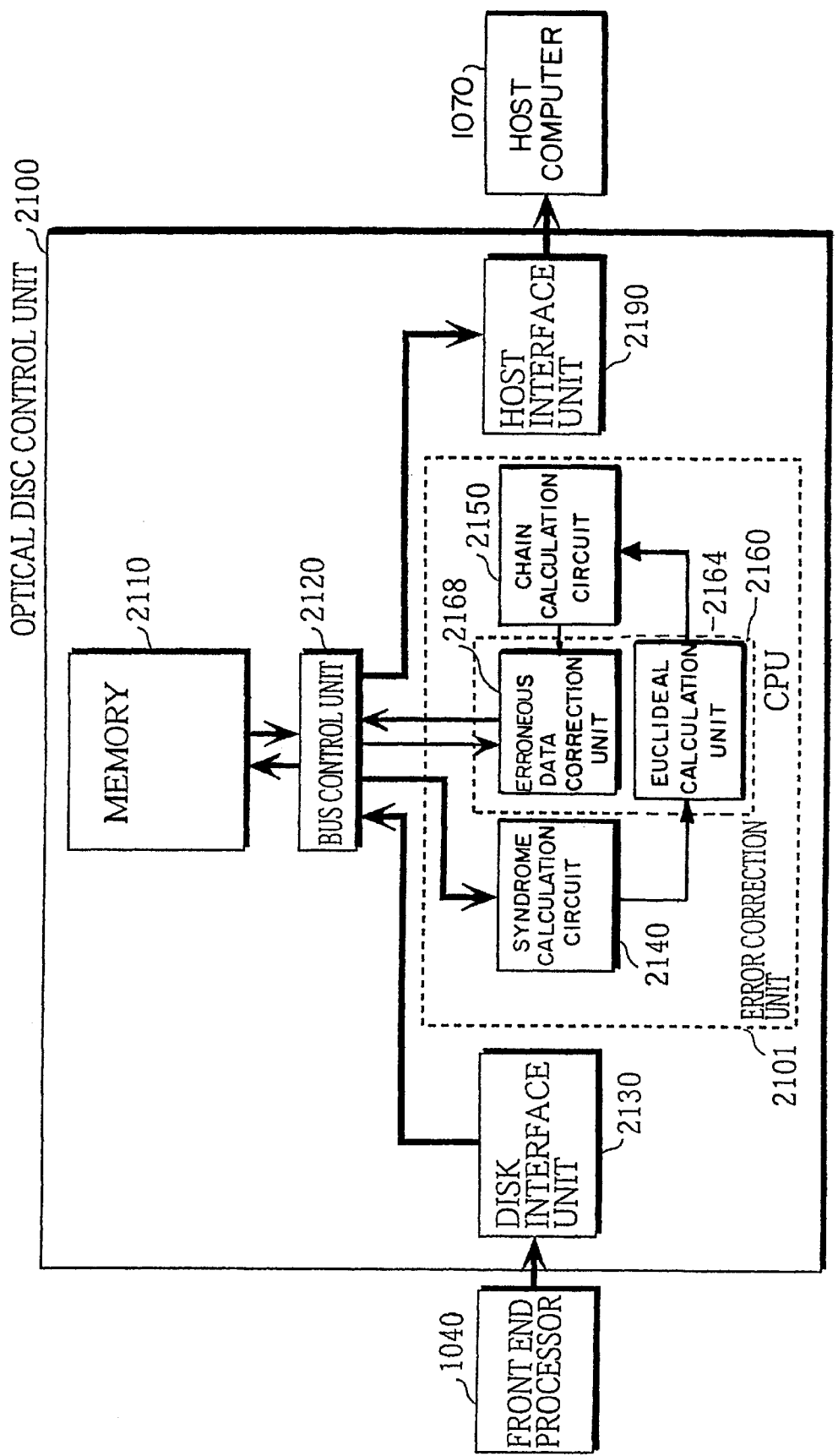
FIG. 8 shows the data flow in optical disc control unit 2100.

FIG. 8 shows the data flow in optical disc control unit 2100.

The data input from front end processor 1040 to optical disc control unit 2100 is transferred from disk interface unit 2130 via bus control unit 2120 and stored in memory 2110. The data stored in memory 2110 is transferred to error correction unit 2101 via bus control unit 2120. Error correction unit 2101 corrects the data in memory 2110 via bus control unit 2120 as necessary. The data on which the error correction process has bene performed is transferred to host interface unit 2190 via bus control unit 2120, and is transmitted from host interface unit 2190 to host computer 1070.

Error correction unit 2101 includes syndrome calculation circuit 2140, chain calculation circuit 2150, Euclidean calculation unit 2164, and erroneous data correction unit 2168. Only syndrome calculation circuit 2140 and erroneous data correction unit 2168 access memory 2110 via bus control unit 2120 as shown in FIG. 8.

Euclidean calculation unit 2164 and erroneous data correction unit 2168 are actually functions realized by CPU 2160 and the program stored in instruction ROM 2170. Euclidean calculation unit 2164 deals with operation (2) and erroneous data correction unit 2168 deals with operation (4) which are described above.

In error correction unit 2101 the following processes are performed: syndrome calculation circuit 2140 fetches data from memory 2110, and calculates the syndrome of the data; Euclidean calculation unit 2164 refers to the syndrome and calculates an error position polynomial and an error value polynomial; chain calculation circuit 2150 calculates an error position based on the result of the calculation received from Euclidean calculation unit 2164; and erroneous data correction unit 2168 calculates an error value by referring to the error position calculated by chain calculation circuit 2150 and the error value polynomial by Euclidean calculation unit 2164, with erroneous data correction unit 2168 updating the data stored in memory 2110 by performing an exclusive OR operation on the error value and the data in memory 2110.

The following is the overall explanation of the access to memory 2110 by optical disc control unit 2100 in optical disc reader 2000, the construction of which has been described above.

Figure 9:
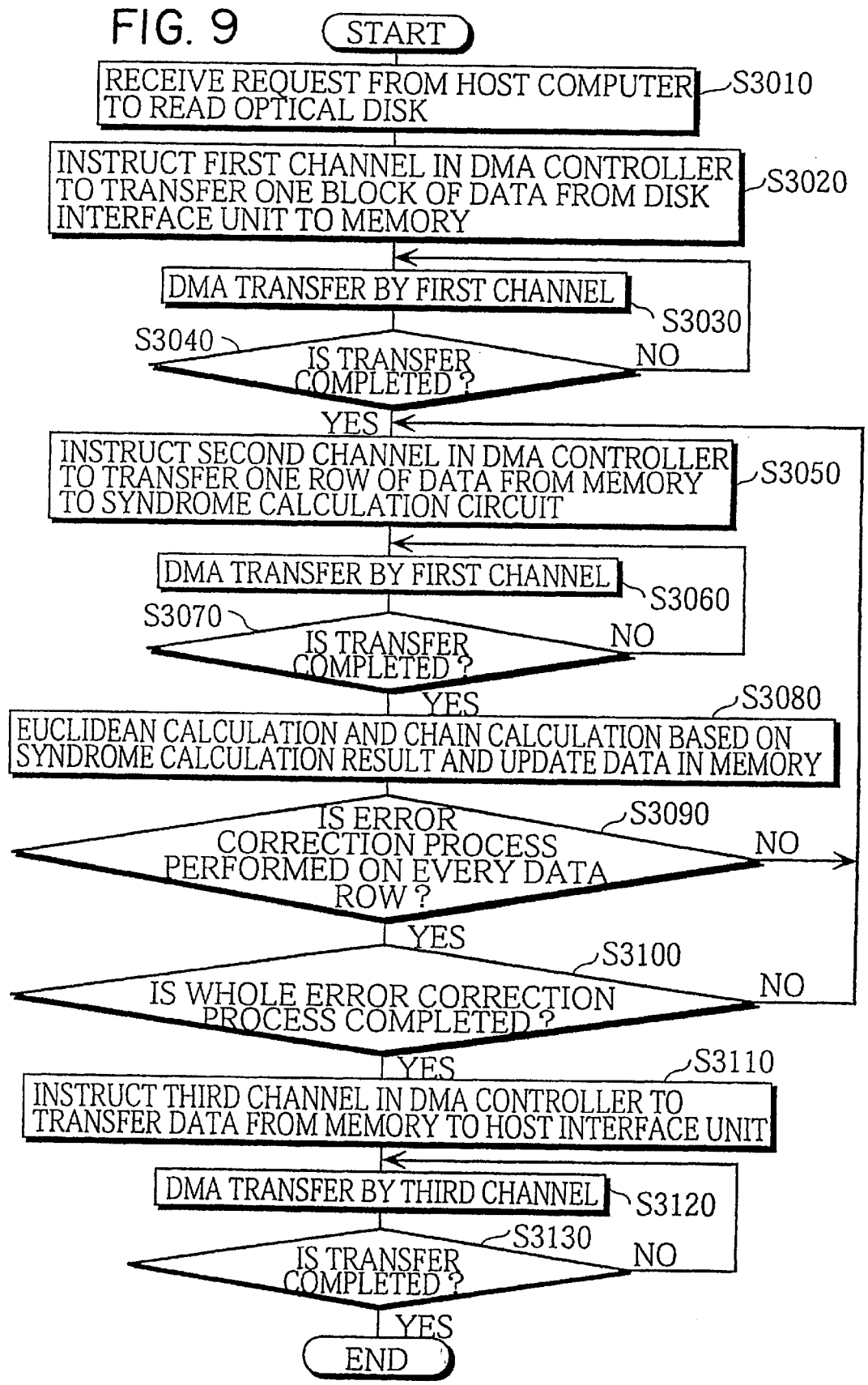
FIG. 9 is a flowchart illustrating an overall operation performed by optical disc control unit 2100.

FIG. 9 is a flowchart illustrating the overall process performed by optical disc control unit 2100.

Optical disc control unit 2100 receives a command to read data on optical disc from host computer 1070 (Step S3010). The command is transferred to system control unit 2200 via bus control unit 2120.

System control unit 2200 obtains the address on the optical disc medium of the data to be read and the required data size from the command. On the basis of this information, system control unit 2200 instructs servo controller 1060 to drive rotation motor 1050 and pickup 1020, and notifies CPU 2160 of the required data size.

Figure 3:
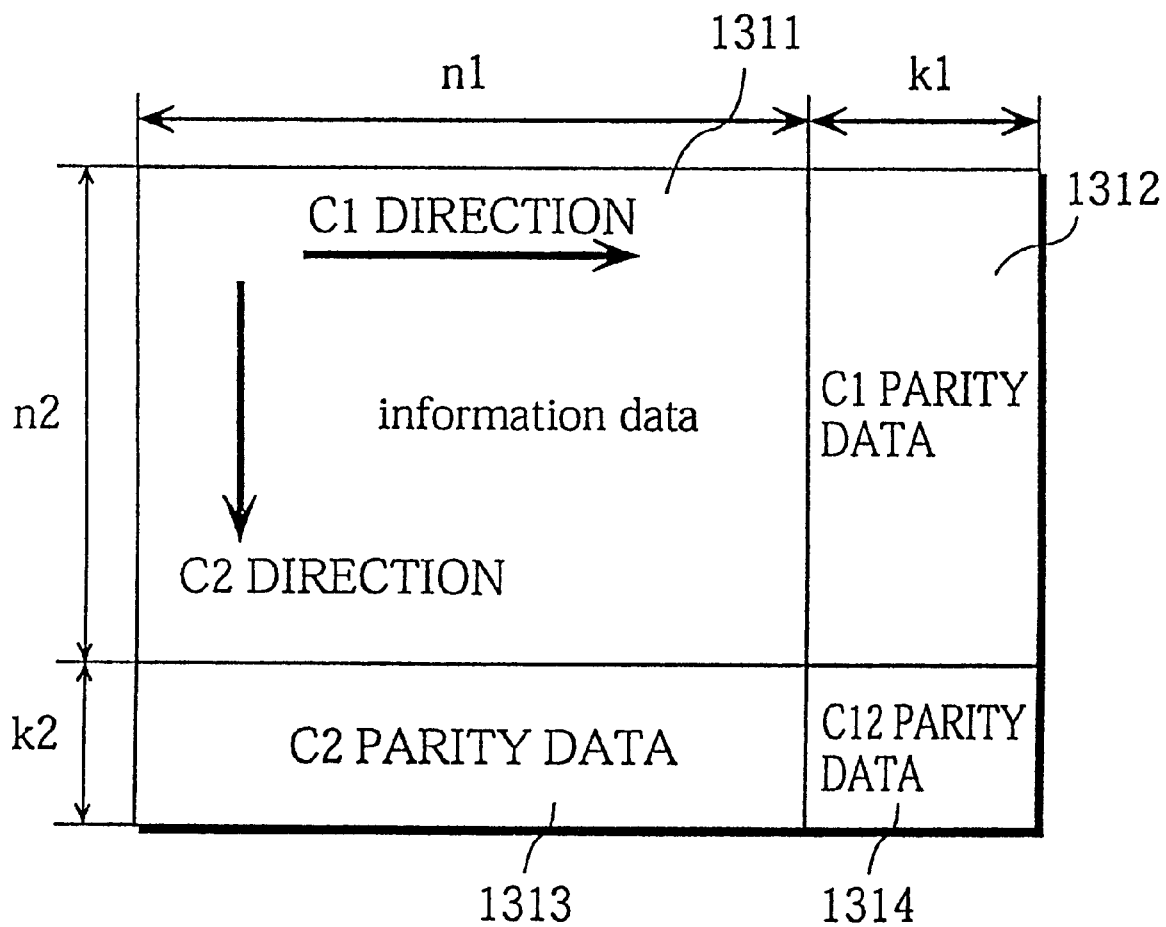
FIG. 3 shows an error-correcting code.
Figure 4:
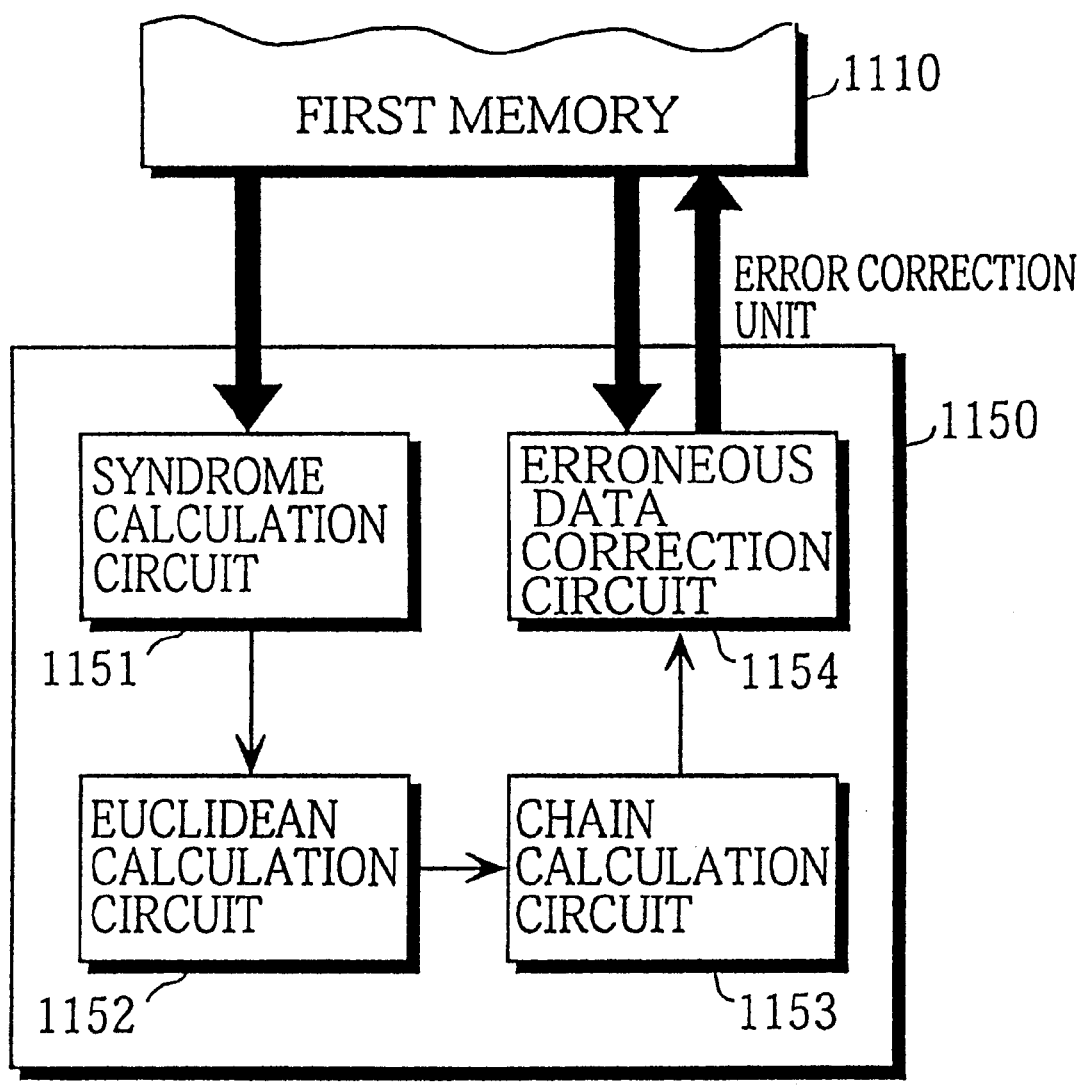
FIG. 4 shows a construction of conventional error correction unit 1150.
Figure 5:
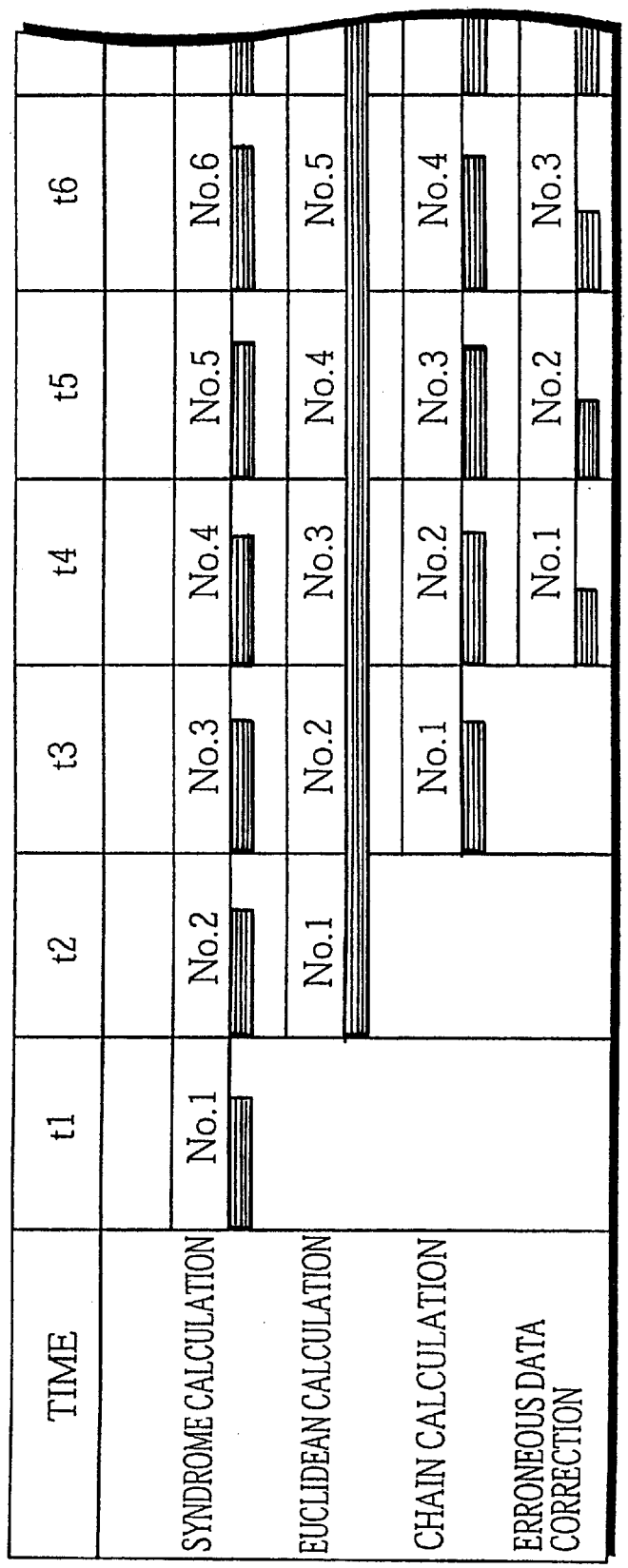
FIG. 5 shows how parallel processing is performed in conventional error correction unit 1150.

In this example, host computer 1070 needs to read one block of data, that is, (n1+k1)×(n2+k2) bytes of data shown in FIG. 3, which in this example is about 38 Kbytes of data.

CPU 2160 instructs the first channel in DMA controller 2122 to transfer one block of data from disk interface unit 2130 to memory 2110 (Step S3020). More specifically, CPU 2160 sets the first channel in DMA controller 2122 so that the address of disk interface unit 2130 is the source address of the data, the address of an area in memory 2110 in which the data is to be stored is the destination address, and one block is the size of the data to be transferred.

Then rotation motor 1050 rotates optical disc 1010, and front end processor 1040 obtains the data from optical disc 1010 via pickup 1020 and amplifier 1030 before transferring the data to disk interface unit 2130 in optical disc control unit 2100.

The data transferred to disk interface unit 2130 is transferred to memory 2110 under the control of disk interface unit 2130 and bus control unit 2120 (Step S3030). The detailed explanation of the control of data transfer will be given later.

After the DMA transfer of one block of data by the first channel (Steps S3030 and S3040), CPU 2160 judges that the transfer is complete on receiving the interrupt that indicates the transfer completion from DMA controller 2122 (Step S3040). CPU 2160 instructs the second DMA channel to transfer the data from memory 2110 to syndrome calculation circuit 2140 (Step S3050). Since syndrome calculation circuit 2140 can receive and perform calculation on data blocks one data sequence at a time (see FIG. 3), CPU 2160 sets the second channel in DMA controller so that the address of an area in memory 2110 in which one data sequence is stored is the source address, the address of syndrome calculation circuit 2140 is the destination address, and one data sequence is the size of the data to be transferred.

One data sequence stored in memory 2110 is transferred to syndrome calculation circuit 2140 under the control of syndrome calculation circuit 2140 and bus control unit 2120, that is, a DMA transfer by the second channel is performed (Steps S3060 and S3070). Syndrome calculation circuit 2140 performs a syndrome calculation on receiving one data sequence.

When CPU 2160 is informed by an interrupt of the completion of the DMA transfer by the second channel (Step S3070), CPU 2160 and chain calculation circuit 2150 perform their calculations based on the calculation results of the syndrome calculation circuit 2140. CPU 2160 corrects the data stored in memory 2110 via bus control unit 2120 as necessary, that is, CPU 2160 actually performs the operation of erroneous data correction unit 2168 (Step S3080). Note that at Step S3070 syndrome calculation circuit 2140 will have finished calculating the syndrome when CPU 2160 receives the interrupt that indicates the completion of the DMA transfer by the second channel.

The detailed explanation of the processing from the syndrome calculation to the erroneous data correction will be given later.

The processing of Steps S3050 to S3080 is performed on each data sequence included in one block of data (Step S3090). Then the processing of Steps S3050 to S3090 is repeated two more times on the same block of data before the whole error correction process on the block of data is complete (Step S3100).

The first error correction is performed in C1 direction as shown in FIG. 3, the second one in C2 direction, and the third one in C1 direction. More specifically, the first error correction at Step S3080 is performed by the row from the 1st row to the (n2+k2)th row using the parity data in C1 direction, and the second error correction is performed by the column from the 1st column to the (n1+k1)th column using the parity data in C2 direction, and the third error correction is performed again by the row from the 1st row to the (n2+k2)th row by means of the parity data in C1 direction (cf. FIG. 3).

When the error correction of one block of data is complete, CPU 2160 instructs the third channel in DMA controller 2122 to transfer the data from memory 2110 to host interface unit 2190 (Step S3110). More specifically, CPU 2160 sets the third channel in DMA controller 2122 so that the address of the area in which the block of data is stored after the error correction is the source address, the address of host interface unit 2190 is the destination address, and one block is the size of the data to be transferred.

Actually, the data to be fetched by host interface unit 2190 from memory 2110 is only the information data, that is, no parity data is transferred to host interface unit 2190. Therefore, it is convenient to store information data and parity data in separate areas in memory 2110 when one block of data is stored in the memory. This separate storage is also convenient because the number of the areas used for storing parity data may be decreased using the same area repeatedly for storing parity data. Consequently, information data and parity data are stored in consecutive addresses in separate memory areas. As a result, all of the data in the memory 2110 that is to be transmitted to the error correcting unit will not be stored in consecutive addresses, and processes such as the setting of the source address need to be repeatedly executed. In the present embodiment, however, one block is described as being transferred in one operation to simplify the explanation.

The DMA transfer by the third channel transfers one block of data in memory 2110 to host interface unit 2190 under the control of host interface unit 2190 and bus control unit 2120 (Steps S3120 and S3130). The detailed explanation of the control over the data transfer will be given later.

DMA controller 2122 informs CPU 2160 of the completion of the DMA transfer by the third channel with an interrupt.

The above mentioned description of the overall processing performed by optical disc control unit 2100 has focused on one block of data. The following explanation will focus on the processing performed for plural blocks of data.

Figure 10:
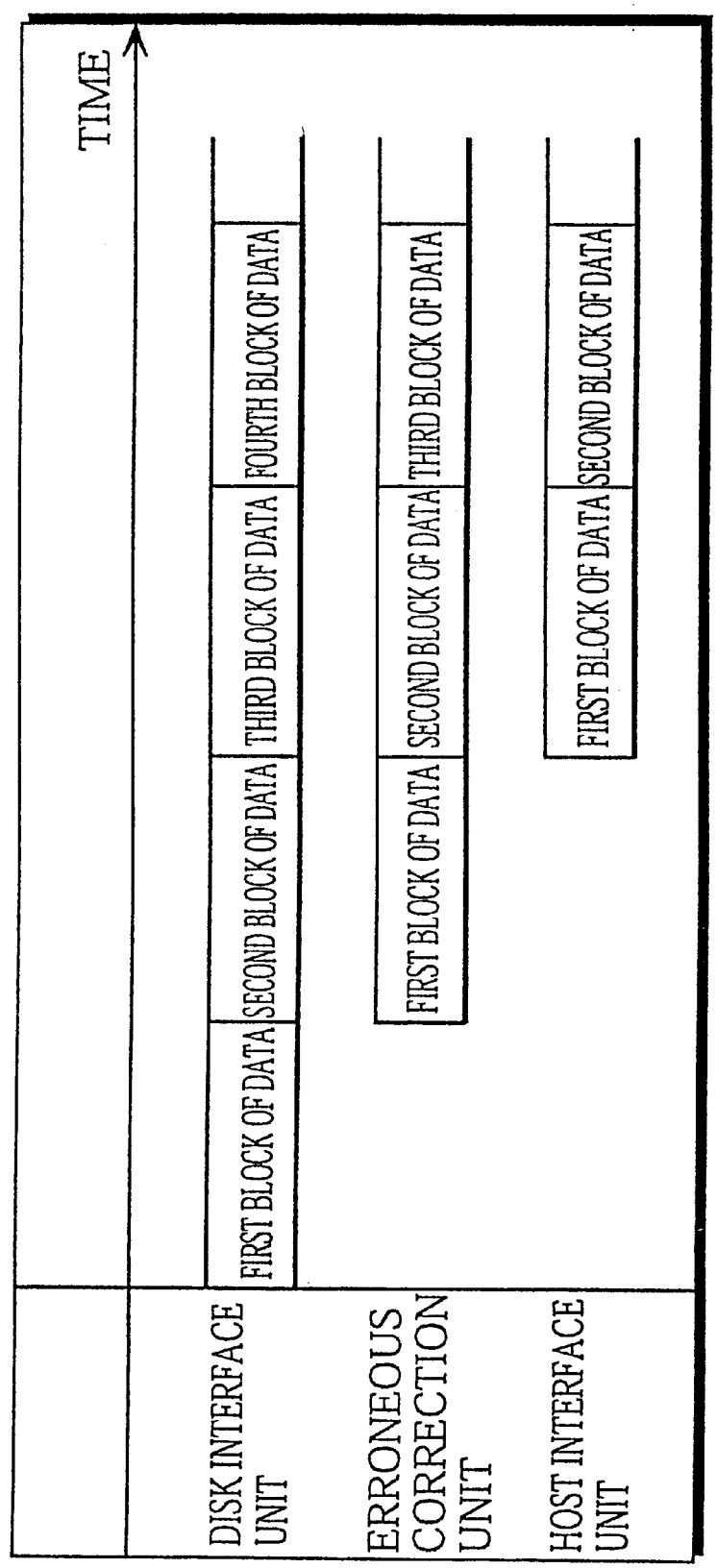
FIG. 10 shows the timing of operation by each unit in optical disc control unit 2100 in processing plural blocks of data.

FIG. 10 shows the timing of operation by each unit in optical disc control unit 2100 in processing plural blocks of data.

Figure 11:
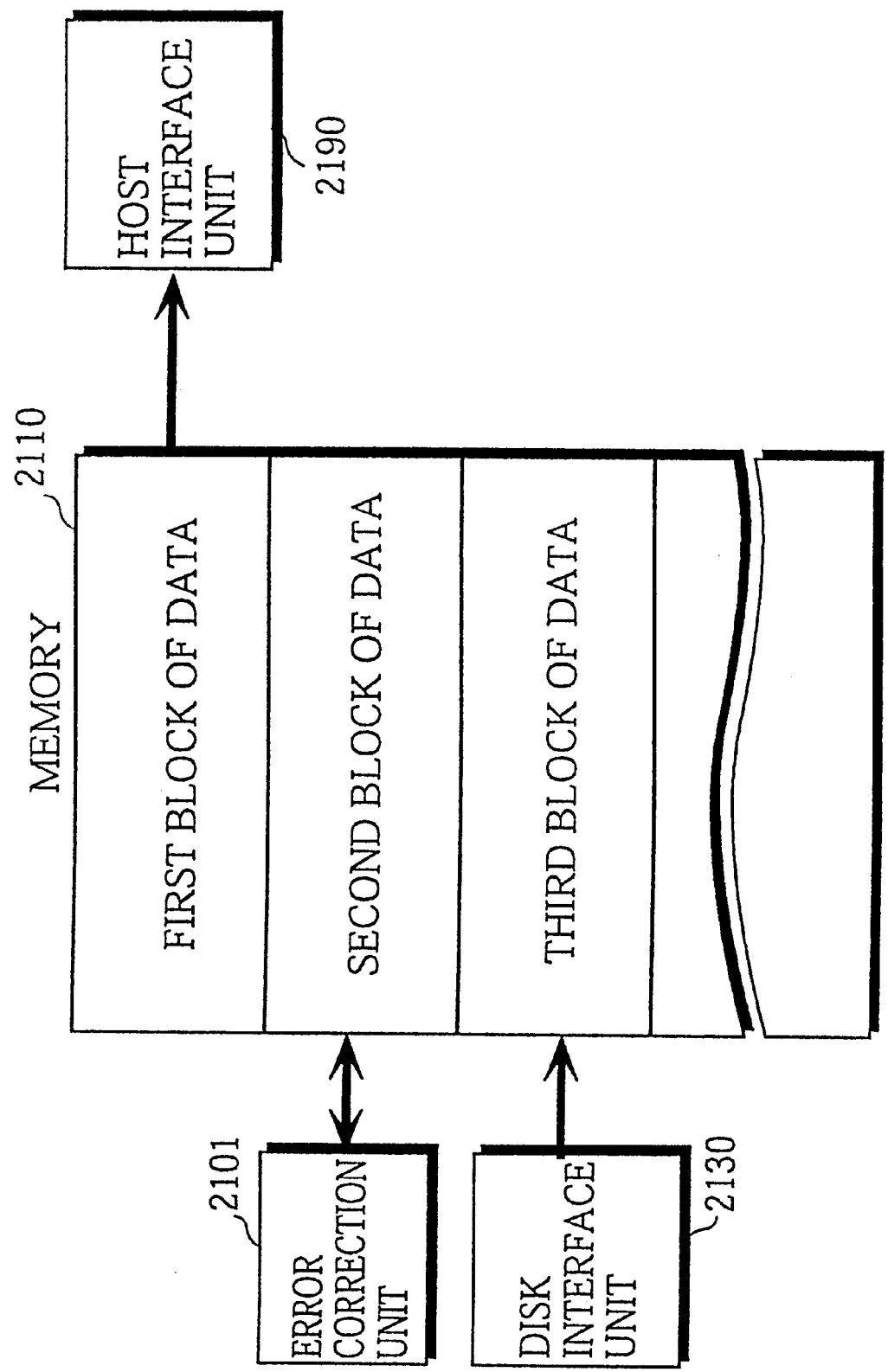
FIG. 11 is a conceptual diagram of the access to memory 2110.

FIG. 11 shows a conceptual diagram of the access to memory 2110.

Each of the first block to the fourth block in FIG. 10 shows one block of data that will be stored in memory 2110.

As shown in FIG. 10, when one block of data has been processed by the disk interface unit 2130, the processing of the block by the error correction unit 2101 begins. When the block has been processed by the error correction unit 2101, the processing of the block by the host interface unit 2190 begins. As a result, parallel processing is performed whereby at any given time, the disk interface unit 2130, the error correction unit 2101, and the host interface unit 2190 will each processing a different block of data.

For instance, while disk interface unit 2130 stores the third block of data in memory 2110, error correction unit 2101 accesses memory 2110 to perform an error correction process on the second block of data, and host interface unit 2190 fetches the first block of data from memory 2110.

FIG. 11 shows the access to memory 2110 in this period of time, with disk interface unit 2130, error correction unit 2101, and host interface unit 2190 accessing different areas in memory 2110.

FIG. 10 shows that each unit performs its process in parallel in a certain period of time. In more detail, however, the access to memory 2110 is switched between disk interface unit 2130, error correction unit 2101, and host interface unit 2190 by bus control unit 2120 at short intervals, since only one access path to memory 2110 is included in optical disc control unit 2100.

If host interface unit 2190 takes more time in fetching one block of data from memory 2110 than disk interface unit 2130 takes in storing one block of data in memory 2110, successive storing of data from disk interface unit 2130 in memory 2110 at regular intervals would cause an overflow of data in memory 2110.

In order to avoid such a problem, the control clock is set for memory 2110 so that the total time that disk interface unit 2130, error correction unit 2101, and host interface unit 2190 take to access memory 2110 in order to process one block of data is shorter than the time that takes to input one block of data to disk interface unit 2130 from outside of optical disc control unit 2100.

The following is an explanation of the address in memory 2110 which is set in DMA controller number 2122 by CPU 2160.

CPU 2160 creates memory management information in data RAM 2180 to manage the state of memory 2110.

FIG. 12 shows the memory management information.

As shown in FIG. 12, memory management information is used for managing the areas in memory 2110 in block units, and manages each block as one of the three conditions "inputtable", "error-correctable", or "outputtable". The initial condition of every memory block is "inputtable".

More specifically, the condition, "inputtable", indicates that a block of data may be input into the memory block from disk interface unit 2130. The condition, "error-correctable", indicates that a block of data has been input into the memory block from disk interface unit 2130. CPU 2160 changes the condition of the memory block from "inputtable" to "error-correctable", when judging that the transfer of a block of data into the memory block in memory 2110 is completed at above-mentioned Step S3040. The condition, "outputtable", indicates that the error correction process has been completed on the block of data stored in the memory block. CPU 2160 changes the condition of the memory block from "error-correctable" to "outputtable", when judging that the error correction process on the block of data stored in the memory block in memory 2110 is completed at above-mentioned step S3100. CPU 2160 changes the condition of the memory block from "outputtable" to "inputtable", when judging that the transfer of the block of data stored in the block in memory 2110 to host interface unit 2190 has completed at above-mentioned Step S3130.

CPU 2160 refers to the memory management information and obtains the memory address of a block by performing a predetermined calculation using the block number. CPU 2160 sets the address of a block whose condition is "inputtable" in the first channel in DMA controller 2122 as the destination address, sets the address of a block whose condition is "error-correctable" in the second channel in DMA controller 2122 as the source address, and sets the address of a block whose condition is "outputtable" in the third channel in DMA controller 2122 as the source address.

The following is the detailed explanation of the data transfer between memory 2110 and each of disk interface unit 2130, error correction unit 2101, and host interface unit 2190.

Figure 13:
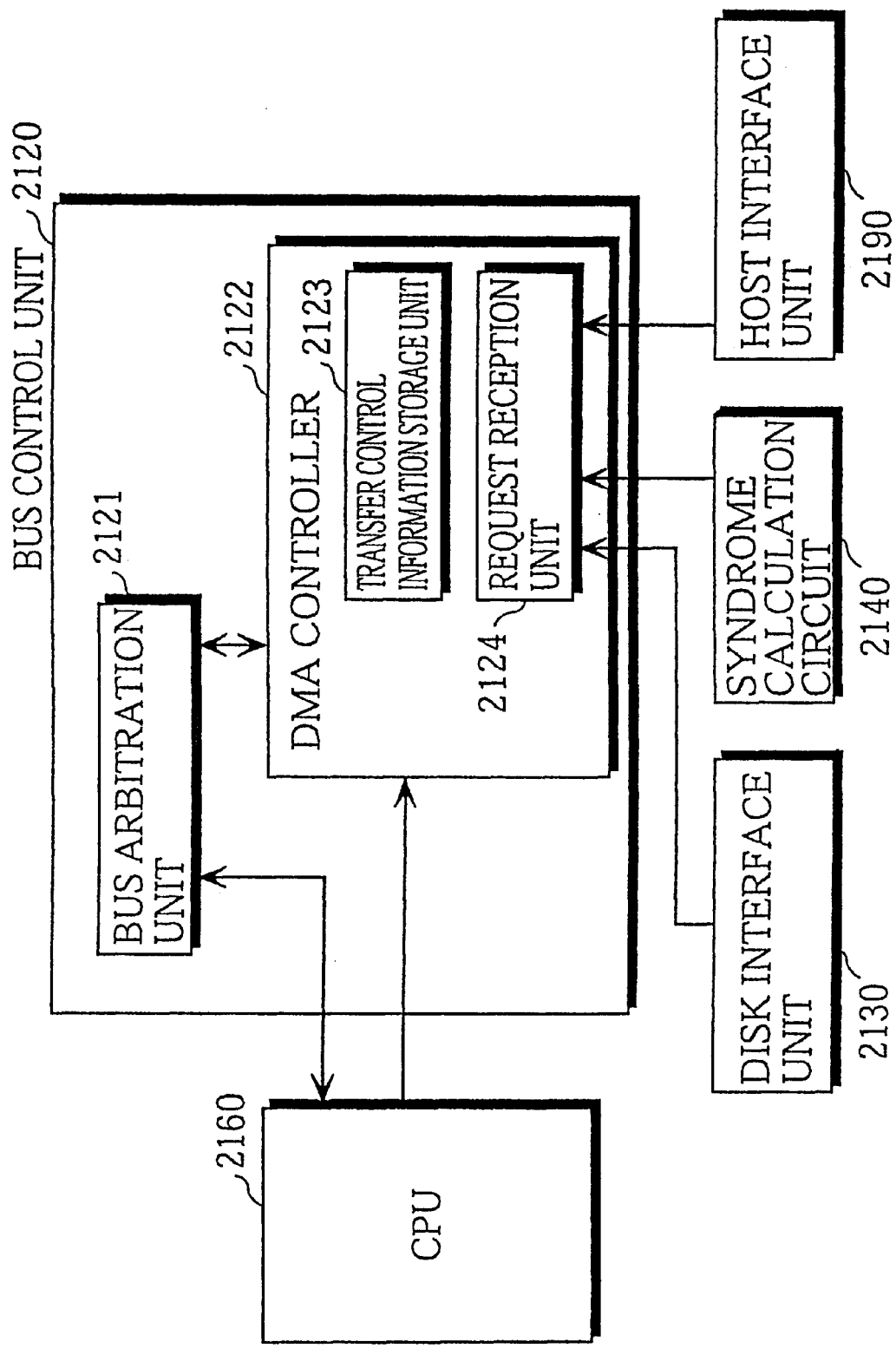
FIG. 13 is a functional block diagram of bus control unit 2120.

FIG. 13 shows a functional block diagram of bus control unit 2120.

Bus control unit 2120, CPU 2160, disk interface unit 2130, syndrome calculation circuit 2140, and host interface unit 2190 are shown in FIG. 13.

Bus control unit 2120 includes DMA controller 2122, which is mentioned above, and bus arbitration unit 2121. DMA controller 2122 includes transfer control information storage unit 2123 and request reception unit 2124.

On receiving a request to use the bus from CPU 2160 or DMA controller 2122, bus arbitration unit 2121 allows the unit to use the bus. CPU 2160 requests to use the bus in order to access the memory for error correction by erroneous data correction unit 2168, to read the result of the calculation by syndrome calculation circuit 2140, to transfer data to chain calculation circuit 2150, or to read the result of the calculation by chain calculation circuit 2150. CPU 2160 refers to information which is stored in instruction ROM 2170 in advance about the address for inputting data to and outputting data from both syndrome calculation circuit 2140 and chain calculation circuit 2150, and the address of data in both disk interface unit 2130 and host interface unit 2190.

Transfer control information storage unit 2123 stores the source address, the destination address, and the size of the data to be transferred, which are input by CPU 2160 for the DMA transfer.

Request reception unit 2124 receives the request to start a transfer from disk interface unit 2130, syndrome calculation circuit 2140, or host interface unit 2190.

The explanation of the control of the data transfer will be given below in accordance with FIGS. 14 to 17.

Figure 14:
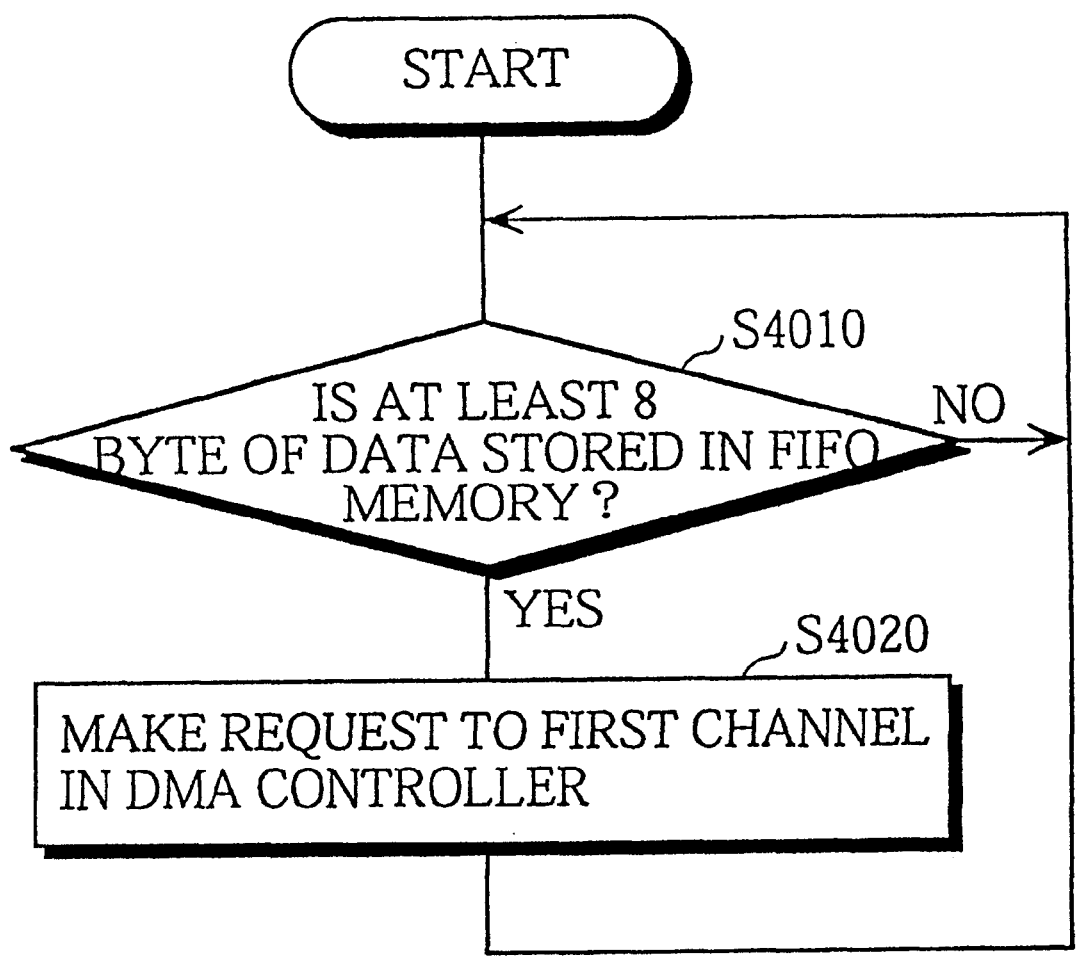
FIG. 14 is a flowchart illustrating a part of the operation performed by disk interface unit 2130.

FIG. 14 is a flowchart illustrating the operation performed by disk interface unit 2130.

Disk interface unit 2130 demodulates the data received from front end processor 1040 and converts it into a predetermined format before storing the data in the FIFO memory. When at least eight bytes of data has been accumulated in the FIFO memory (Step S4010), disk interface unit 2130 makes a request to the first channel in DMA controller 2122 (Step S4020). The request is received by request reception unit 2124.

Data is constantly input to disk interface unit 2130 at a predetermined transmission rate, so that disk interface unit 2130 transfers a request at Step S4020 at a fairly constant interval.

Figure 15:
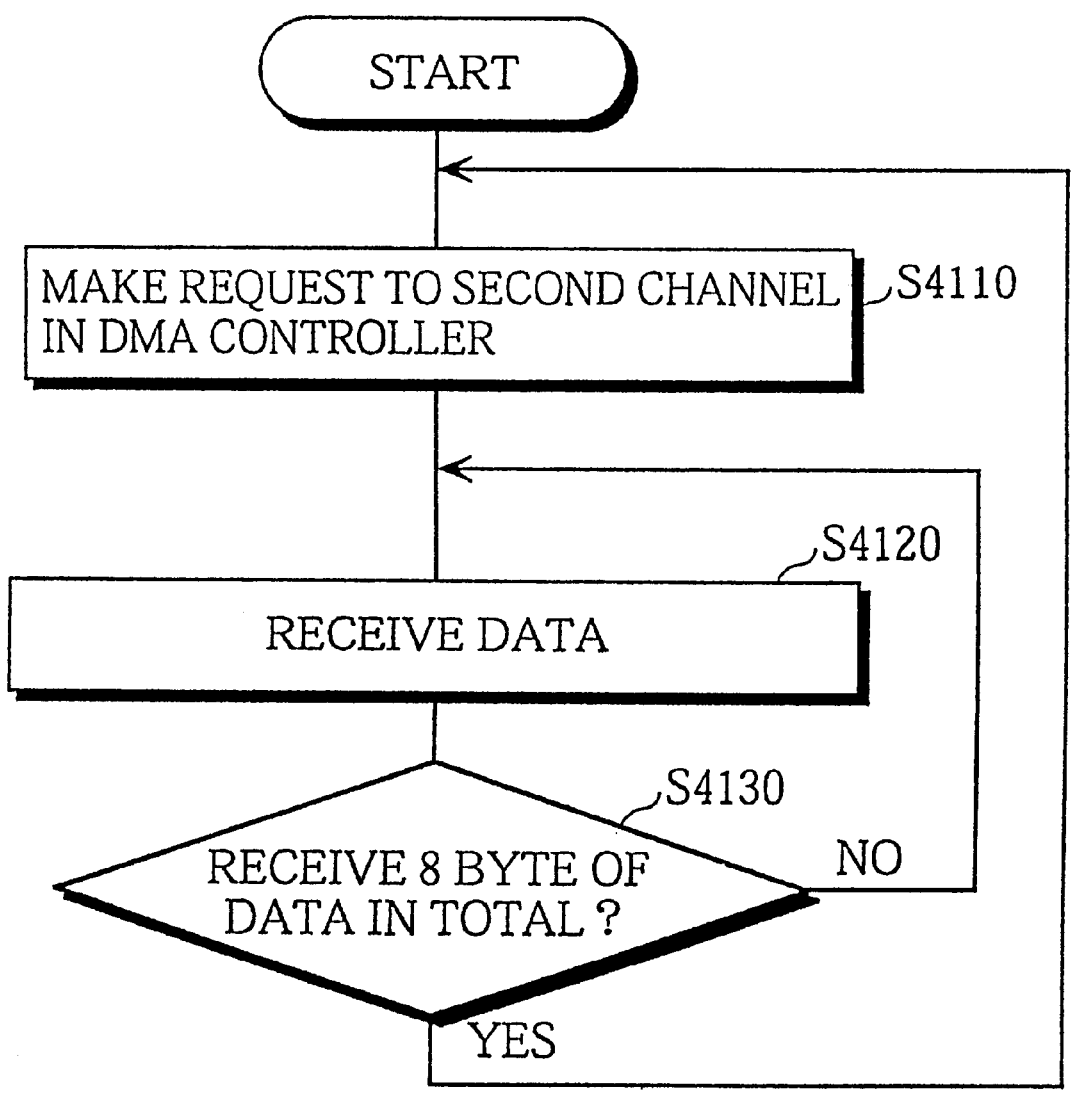
FIG. 15 is a flowchart illustrating a part of the operation performed by syndrome calculation circuit 2140.

FIG. 15 is a flowchart illustrating one part of the process performed by syndrome calculation circuit 2140.

Syndrome calculation circuit 2140 transfers to request reception unit 2124 a request addressed to the second channel in DMA controller 2122 (Step S4110).

Syndrome calculation circuit 2140 receives the transferred data (Step S4120), and repeats the reception if it has not yet received eight bytes of data in total (Step S4130). When a total of eight bytes of data has been received, syndrome calculation circuit 2140 makes another request addressed to the second channel in DMA controller 2122 (Steps S4130 and S4110).

Syndrome calculation circuit 2140 performs a syndrome calculation (not illustrated in FIG. 15) on the data received at Step S4120, while receiving other data.

Figure 16:
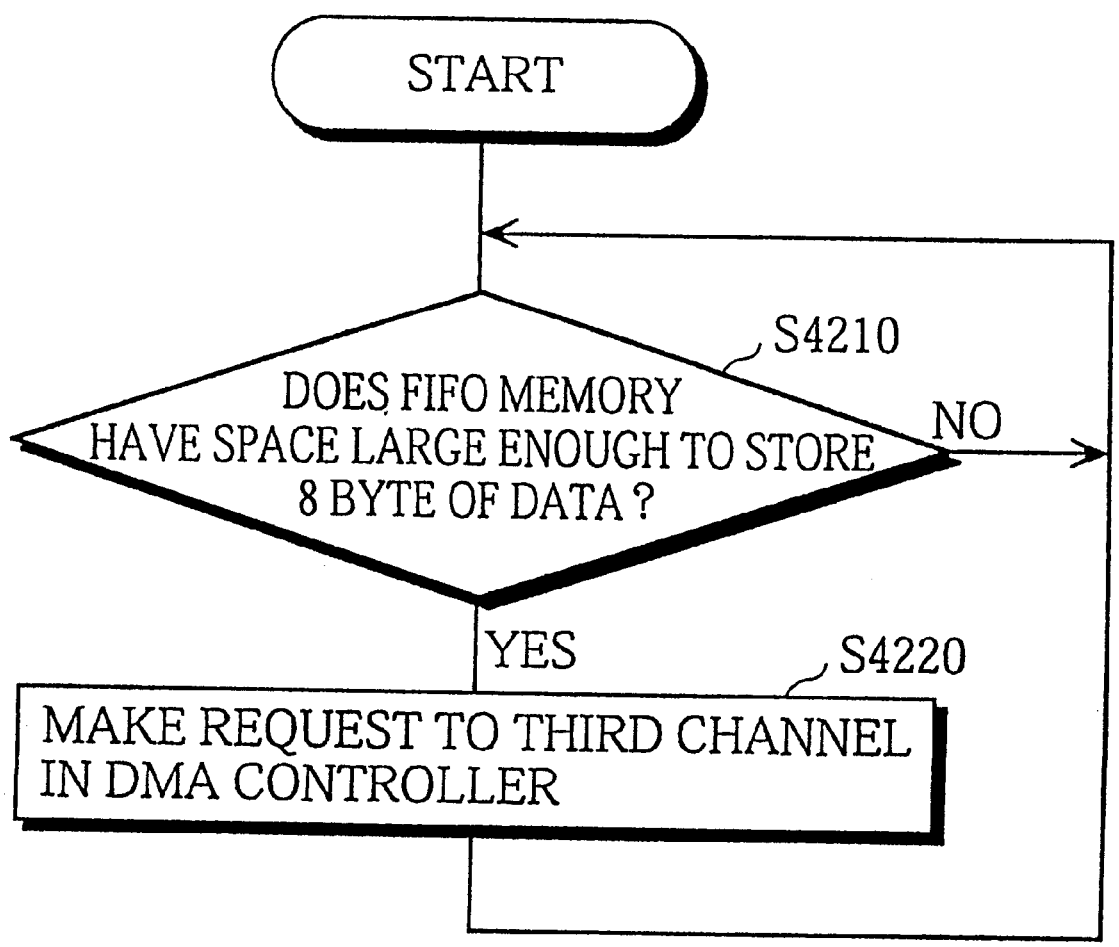
FIG. 16 is a flowchart illustrating a part of the operation performed by host interface unit 2190.

FIG. 16 shows a flowchart illustrating a part of the process performed by host interface unit 2190.

Host interface unit 2190 is connected with host computer 1070 by an ATAPI (AT attachment packet interface), and stores data fetched from memory 2110 in the FIFO memory. The ATAPI transmits the data that is stored in the FIFO memory to host computer 1070 at a predetermined transmission rate.

In order to maintain the predetermined rate of data transmission, it is necessary for host interface unit 2190 to ensure that sufficient data is stored in its FIFO memory. Therefore, host interface unit 2190 performs the operation shown in FIG. 16.

Host interface unit 2190 transfers to request reception unit 2124 a request addressed to the third channel in DMA controller when the FIFO memory has at least eight bytes of step (Step S4220).

Figure 17:
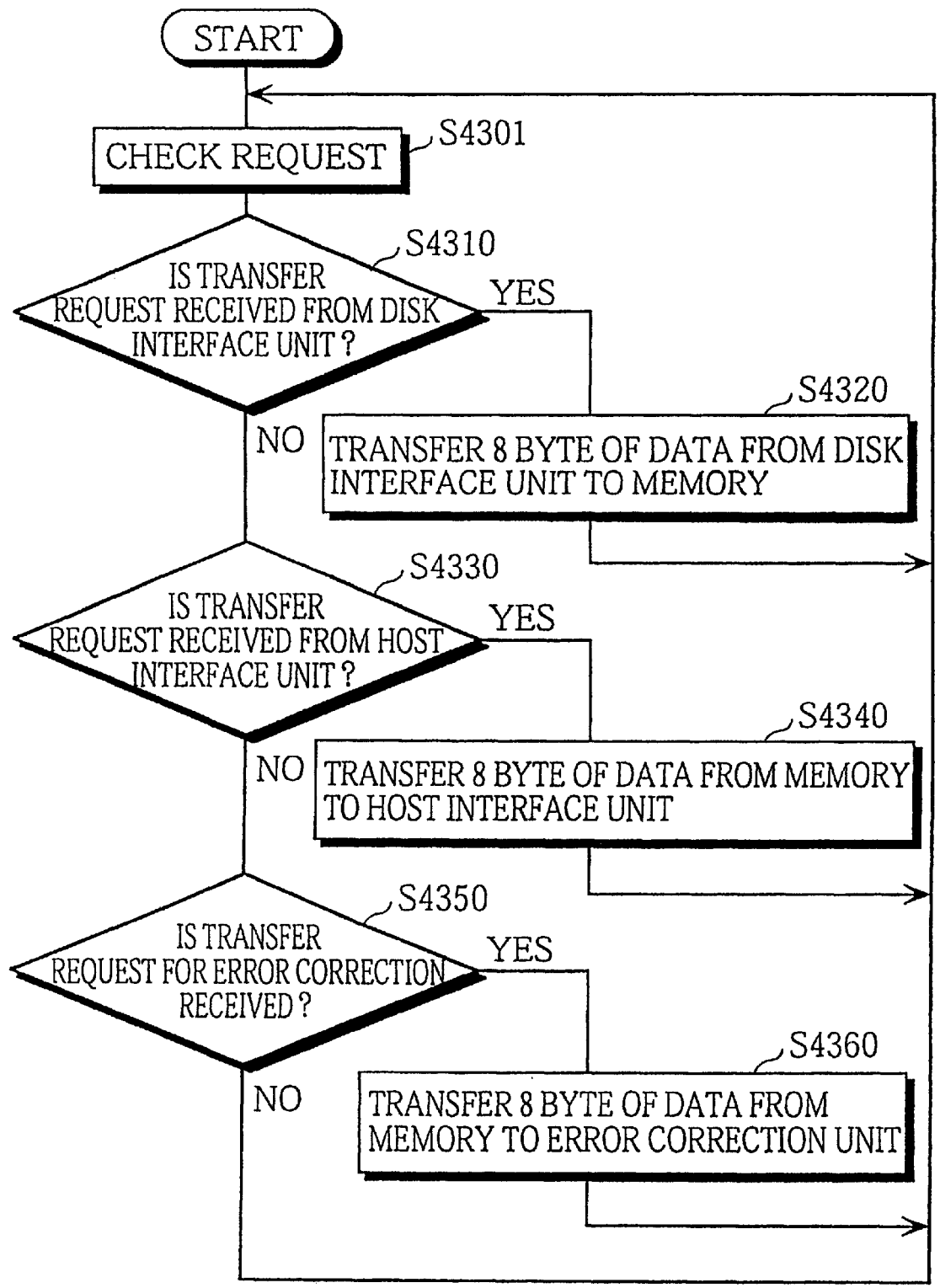
FIG. 17 is a flowchart illustrating a part of the operation performed by bus control unit 2120.

FIG. 17 is a flowchart illustrating a part of the process performed by bus control unit 2120.

Bus control unit 2120 controls the data transfer between disk interface unit 2130 and memory 2110, the data transfer between host interface unit 2190 and memory 2110, and the memory access in the error correction process by deciding the priority for each of them. The data transfer between disk interface unit 2130 and memory 2110 has the highest priority, and the data transfer between host interface unit 2190 and memory 2110 has the second highest priority. The memory access in the error correction process has the lowest priority. The memory access in the error correction process referred to here is the data transfer from memory 2110 to syndrome calculation circuit 2140 and the data transfer between CPU 2160 and memory 2110.

Bus arbitration unit 2121 checks the request received by request reception unit 2124 (Step S4301), and uses the check result at Step S4310, S4330, and S4350.

When a request from disk interface unit 2130 has been received (step S4310), bus arbitration unit 2121 allows the first channel in DMA controller 2122 to use a bus. Bus control unit 2120 transfers eight bytes of data from disk interface unit 2130 to memory 2110 by means of DMA controller 2122 (Step S4320). This data transfer is an aforementioned DMA transfer by the first channel performed on the basis of the information about the sender and the receiver that is set by CPU 2160 and is stored in transfer control information storage unit 2123.

When a request from host interface unit 2190 has been received and no request from above-mentioned disk interface unit 2130 has been received (Step S4330), bus arbitration unit 2121 allows the third channel in DMA controller 2122 to use the bus. Bus control unit 2120 transfers eight bytes of data from memory 2110 to host interface unit 2190 by means of DMA controller 2122 (Step S4340). This data transfer is a DMA transfer by the third channel.

When a request from syndrome calculation circuit 2140 has been received via request reception unit 2124 and no request has been received from above-mentioned disk interface unit 2130 or host interface unit 2190 (Step S4350), bus arbitration unit 2121 allows the second channel in DMA controller 2122 to use the bus. Bus control unit 2120 has DMA controller 2122 to transfer eight bytes of data from memory 2110 to syndrome calculation circuit 2140 (Step S4360).

When a request to access memory 2110 from CPU 2160 in performing the operation of error correction unit 2168 has been received, bus arbitration unit 2121 allows the use of the bus for data transmission only if no request has been received from disk interface unit 2130 or host interface unit 2190, as in the case of a request from syndrome calculation circuit 2140 has been received. Bus arbitration unit 2121, however, gives a request from syndrome calculation 2140 priority over a request form CPU 2160. In other words, the memory access by CPU 2160, which performs the operation of erroneous data correction unit 2168, is conducted in one byte units only if no other requests for memory access have been received by bus arbitration unit 2121. The frequency of the access to memory 2110 from CPU 2160, which performs the operation of erroneous data correction unit 2168, is much lower than that of the DMA transfers by the first to third channel.

Bus control unit 2120 performs the operation at Steps S4320, S4340, or S4360, and returns to the request check performed by request reception unit 2124 (Step S4301) to repeat the process shown in FIG. 17.

Figure 18:
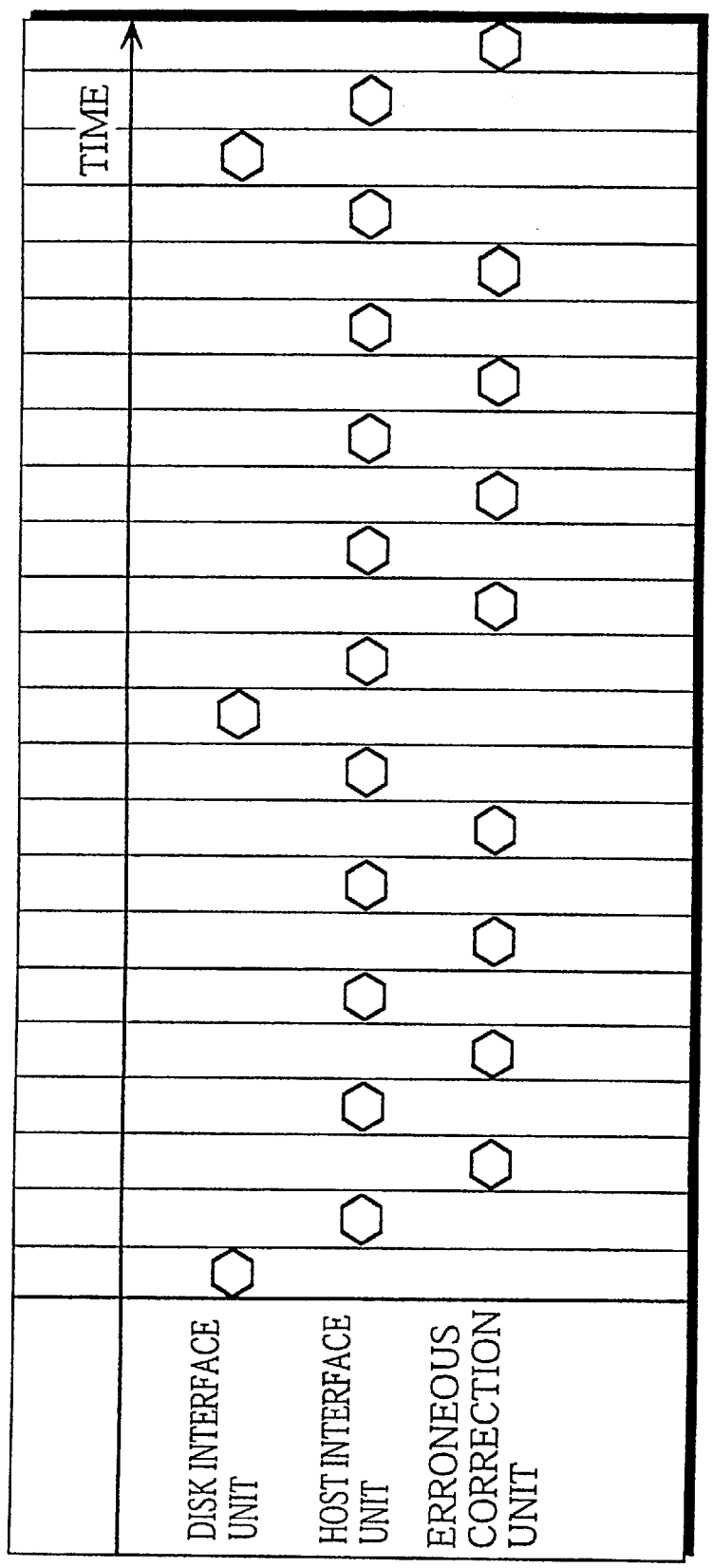
FIG. 18 shows the timing of the data transfer to and from memory 2110.

FIG. 18 shows the timing of data transfers to and from memory 2110.

In the example shown in FIG. 18, data is constantly input from front end processor 1040 to the FIFO memory in disk interface unit 2130 at the relatively low transmission rate. FIG. 18 shows that eight bytes of data is transferred from disk interface unit 2130 to memory 2110 at the longest interval.

In FIG. 18, it is necessary for host interface unit 2190 to transmit data to the host computer at a relatively high transmission rate, so that eight bytes of data is transferred from memory 2110 to host interface unit 2190 at short intervals while no data is being transferred from disk interface unit 2190 to memory 2110.

The data transfer for error correction, which has lower priority than the two above-mentioned data transfers, is performed while neither of these two data transfers is being performed.

The reason why eight bytes of data is transferred in the DMA transfers by the first to the third channel is given below.

In the DMA transfers, memory access takes longer than the access to any other shaped resource. The management of conflicts when performing memory access is described below.

Memory 2110 is a dynamic memory which is controlled by two control clocks, a RAS (row address strobe) and a CAS (column address strobe). Memory access in which a relatively large amount of data is transferred by means of a page mode where the RAS is fixed and the CAS varies continually increases the access rate per byte. For this reason DMA transfer should be performed for several bytes of data at a time.

For instance, suppose that data is transmitted from front end processor 1040 at on average transmission rate of v byte/s, and the error correction process is performed three times on the data in C1, C2, and C1 direction as mentioned above. In addition to the three DMA transfers by the second channel, a DMA transfer by the first channel and that by the third channel are performed. In total, five DMA transfers are performed on the same data. Under these circumstances, it is necessary to transfer 5 v bytes of data per second to or from the memory. When it takes t seconds per byte to transfer data to or from the memory when transferring data in relatively large amount, it takes 5 vt seconds to complete all the memory accesses. In this case, 5 vt second needs to be equal to or shorter than 1 second. In order to achieve such high speed memory transfer, DMA transfers are performed for large amount of data.

Bus control unit 2120, however, judges a request for every DMA transfer of the predetermined number of bytes of data (cf. FIG. 17). If a DMA transfer for a large number of bytes of data is to be performed, it is impossible for bus control unit 2120 to respond immediately to a request from a circuit, such as disk interface unit 2130 or host interface unit 2190, which is required to transfer data at a fixed transfer rate.

For instance, when data is stored in the FIFO memory in disk interface unit 2130 and it becomes necessary to perform a DMA transfer by the first channel, if a DMA transfer by the second or the third channel is being performed, then the DMA transfer by the first channel will be performed after the completion of the DMA transfer by the second or the third channel that is performed on the predetermined number of bytes of data.

Here, if DMA transfer by the first channel has the highest priority, if front end processor 1040 transmits data at a rate of v byte/s on average, if the FIFO memory in disk interface unit 2130 has a capacity of m bytes of data, and if it takes T seconds to transfer the above-mentioned predetermined number of bytes of data to or from the memory by the DMA transfer, then the above-mentioned predetermined number of bytes of data needs to be small enough to satisfy the condition "m/v>T".

Consequently, it is necessary to perform a data transfer for an appropriate number of bytes of data. In the present embodiment, eight bytes of data, which satisfies the above-mentioned condition, is determined to be transferred in every data transfer by referring to the rate of the control clock that controls memory 2110.

As described above, optical disc control unit 2100 includes an access controller, the core unit of which is bus control unit 2120. With this access controller, optical disc control unit 2100 inputs data, corrects any errors in the data, and outputs the corrected data using only one memory, memory 2110.
(error Correction Unit)

The following is the more detailed explanation of error correction unit 2101 in above-mentioned optical disc control unit 2100.

As mentioned above, error correction unit 2101 includes syndrome calculation circuit 2140, chain calculation circuit 2150, Euclidean calculation unit 2164, and erroneous data correction unit 2168. The operations of Euclidean calculation unit 2164 and erroneous data correction unit 2168 are actually performed by CPU 2160 and the program stored in instruction ROM 2170.

The program performs the Euclidean calculation and the erroneous data correction, as well as fetching the result of the syndrome calculation from syndrome calculation circuit 2140 and transferring data to and from chain calculation circuit 2150. The functional part for the error correction process performed by CPU 2160, data RAM 2180, and the program stored in instruction ROM 2170 is called the error correction control unit.

Figure 19:
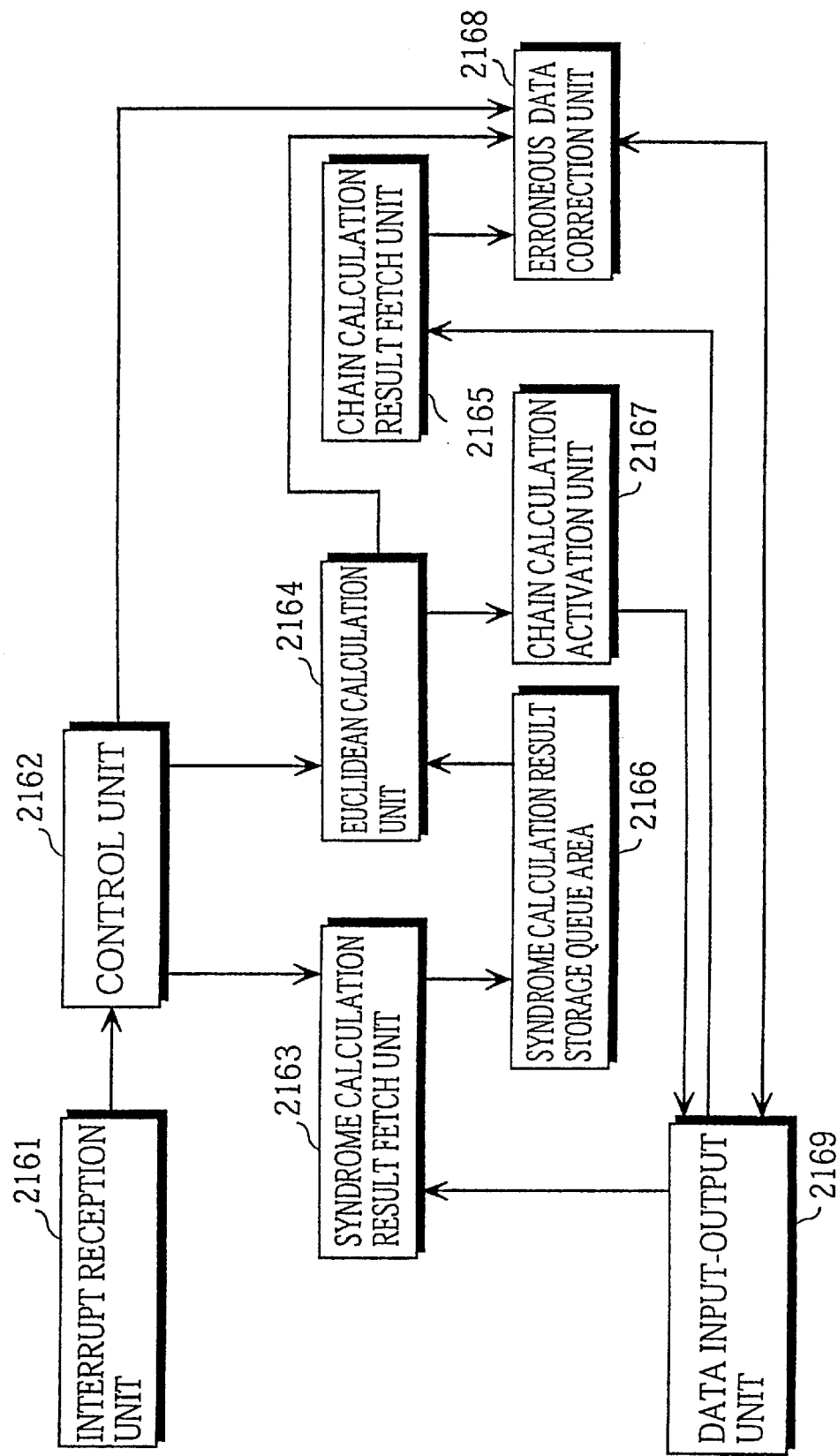
FIG. 19 is a functional block diagram of an error correction control unit.

FIG. 19 is a functional block diagram of the error correction control unit.

The error correction control unit includes interrupt reception unit 2161, control unit 2162, syndrome calculation result fetch unit 2168, Euclidean calculation unit 2164, chain calculation result fetch unit 2165, syndrome calculation result storage queue area 2166, chain calculation activation unit 2167, erroneous data correction unit 2168, and data input-output unit 2169.

Interrupt reception unit 2161 receives the interrupt to CPU 2160. Control unit 2162 controls the execution of the program stored in instruction ROM 2170.

Data input-output unit 2169 transfers data to and from other circuits via bus control unit 2120, and transfers data between the registers in CPU 2160 and other circuits.

Syndrome calculation results storage queue area 2166 is one area in data RAM 2180, and is a queue which stores up to 10 sets of syndrome calculation results.

Syndrome calculation result fetch unit 2163 fetches the syndrome calculation result from syndrome calculation circuit 2140 via data input-output unit 2169, and stores the result in syndrome calculation result storage queue area 2166.

Euclidean calculation unit 2164 fetches the data of one set of syndrome calculation results from syndrome calculation result storage queue area 2166, and, based on these results, instructs chain calculation activation unit 2167 to activate chain calculation circuit 2150 as necessary. Chain calculation circuit 2150 starts its calculation on receiving data. In other words, to activate chain calculation circuit 2150 is to give data to the chain calculation circuit in the present embodiment.

Chain calculation activation unit 2167 transfers the data of the Euclidean calculation result to chain calculation circuit 2150 via data input-output unit 2169 in response to the instruction from Euclidean calculation unit 2164, and so activates chain calculation circuit 2150.

Chain calculation result fetch unit 2165 fetches the chain calculation result calculated by chain calculation circuit 2150 via data input-output unit 2169, and transfers the result to erroneous data correction unit 2168.

Erroneous data correction unit 2168 accesses memory 2110 via data input-output unit 2169 to update the data stored in memory 2110.

The following is the explanation of the operation performed by the error correction control unit, the construction of which is explained above, in accordance with FIGS. 20 to 22.

Figure 20:
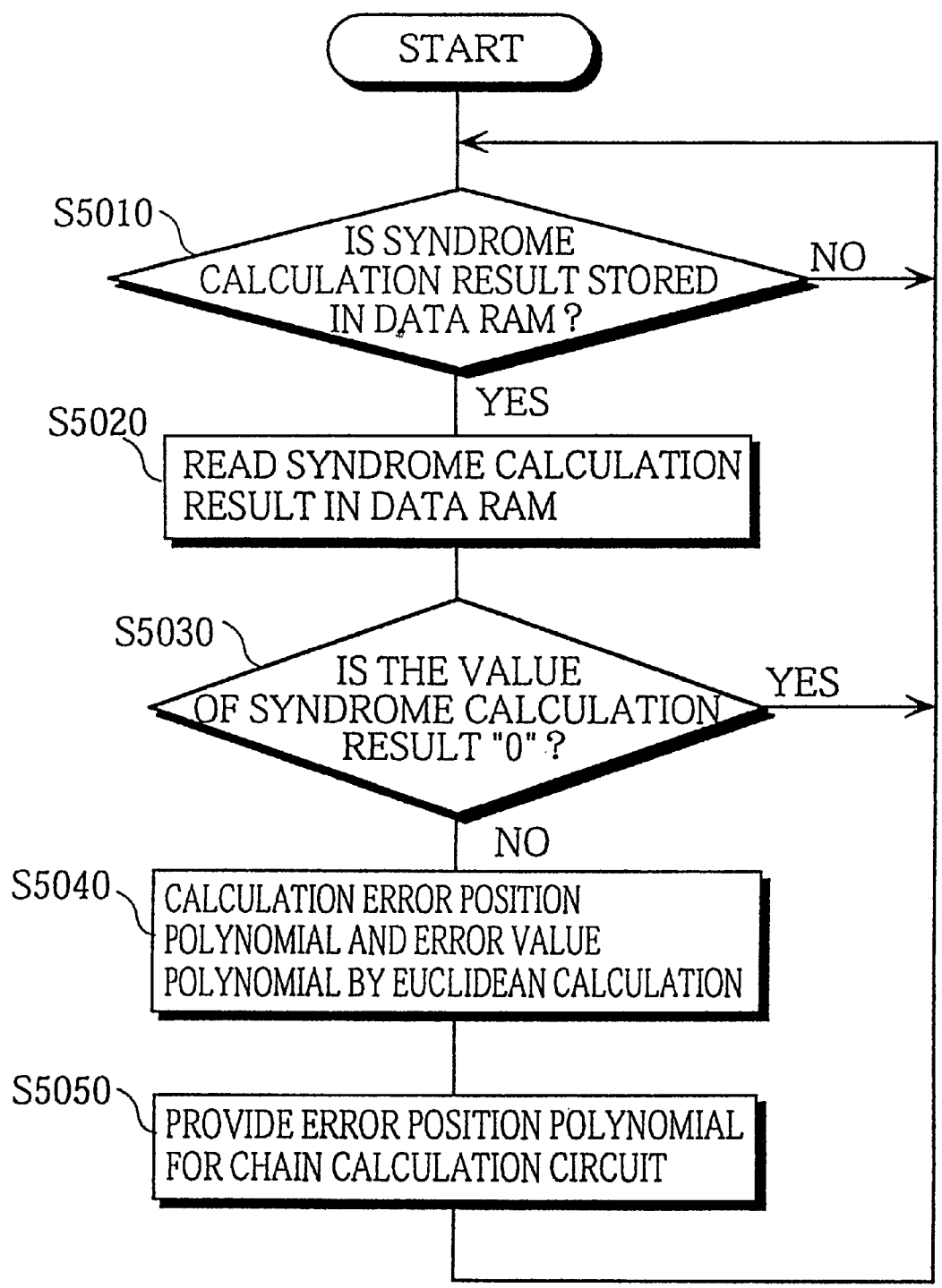
FIG. 20 is a flowchart illustrating the normal operation performed by the error correction control unit.

FIG. 20 is a flowchart illustrating the normal operation performed by the error correction control unit.

The normal operation of the error correction control unit is performed by Euclidean calculation unit 2164.

Euclidean calculation unit 2164 checks whether the syndrome calculation result is stored in syndrome calculation result storage queue area 2166, and repeats the check until the result is found to be stored there (Step S5010). While Euclidean calculation unit 2164 repeats the check at Step S5010, CPU 2160 performs other operations, that is, the operations that respond to an interrupt and other operations aside from those performed for the error correction control unit.

When the syndrome calculation result is stored in syndrome calculation result storage queue area 2166, Euclidean calculation unit 2164 reads the syndrome calculation result in syndrome calculation result storage queue 2166 in data RAM 2180 (Step S5020). When the value of the syndrome calculation result is "0", no error is included in the data sequence (Step S5030). The process returns to Step S5010.

When the syndrome value is not "0" (Step S5030), the data sequence includes an error to be corrected. Euclidean calculation unit 2164 performs an Euclidean calculation on the syndrome value to obtain the error position polynomial and the error value polynomial (Step S5040).

Euclidean calculation unit 2164 provides the error position polynomial for chain calculation circuit 2150 via chain calculation activation unit 2167 after the Euclidean calculation (Step S5050). The process returns to Step S5010.

Figure 21:
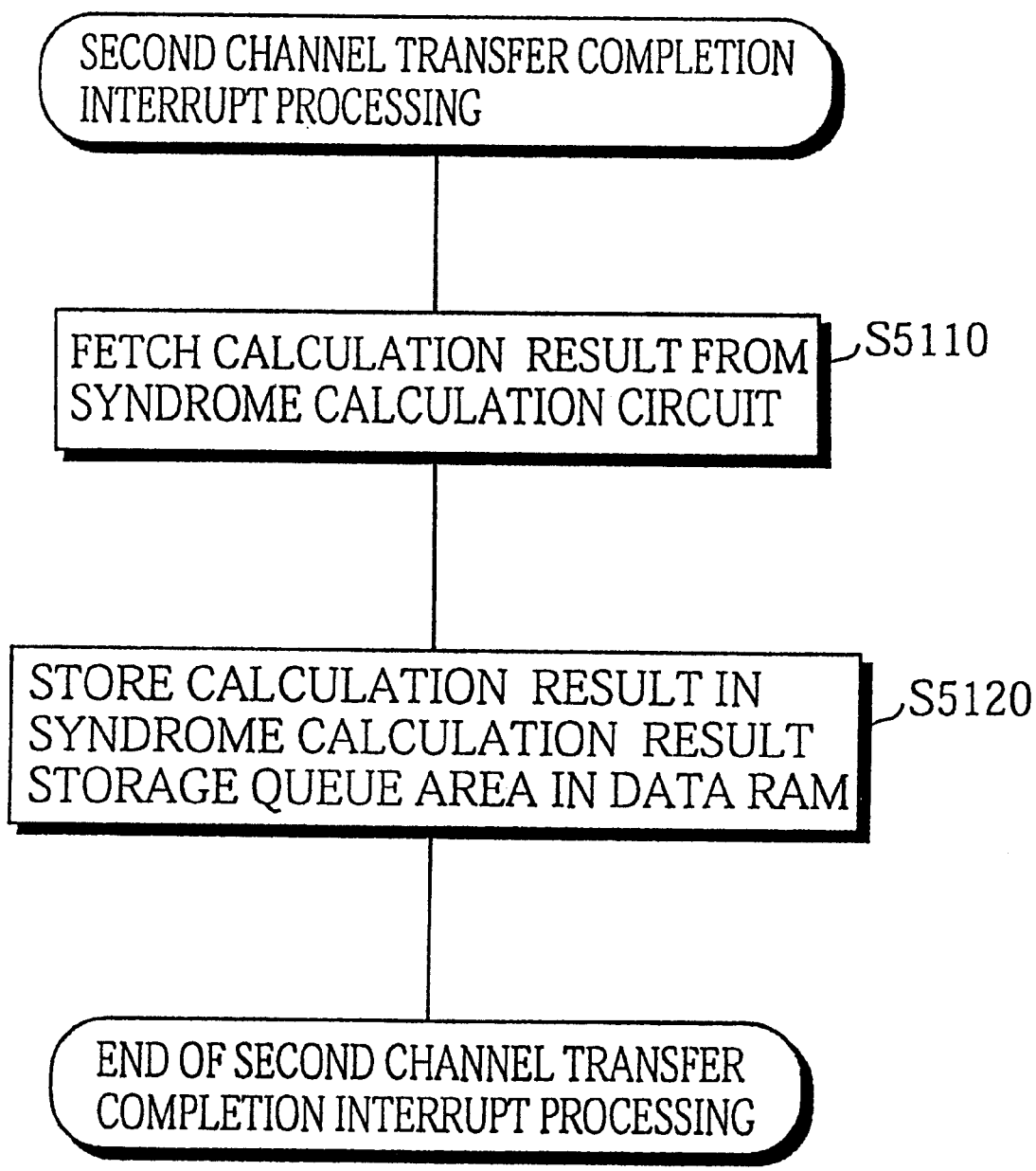
FIG. 21 is a flowchart illustrating a second channel transfer completion interrupt processing.

FIG. 21 is a flowchart illustrating the second channel transfer completion interrupt process.

The second channel transfer completion interrupt process is an interrupt process performed when interrupt reception unit 2161 in the error correction control unit is informed of the completion of a DMA transfer by the second channel.

On receiving the notice that interrupt reception unit 2161 has received an interrupt, control unit 2162 instructs Euclidean calculation unit 2164 to temporarily stop the operation shown in FIG. 20. Control unit 2162 instructs syndrome calculation result fetch unit 2163 to fetch the calculation result from syndrome calculation circuit 2140 (Step S5110), and to store the calculation result in syndrome calculation result storage queue area 2166 in data RAM 2180 (Step S5120). Then control unit 2162 instructs Euclidean calculation unit 2164 to resume the operation shown in FIG. 20.

Figure 22:
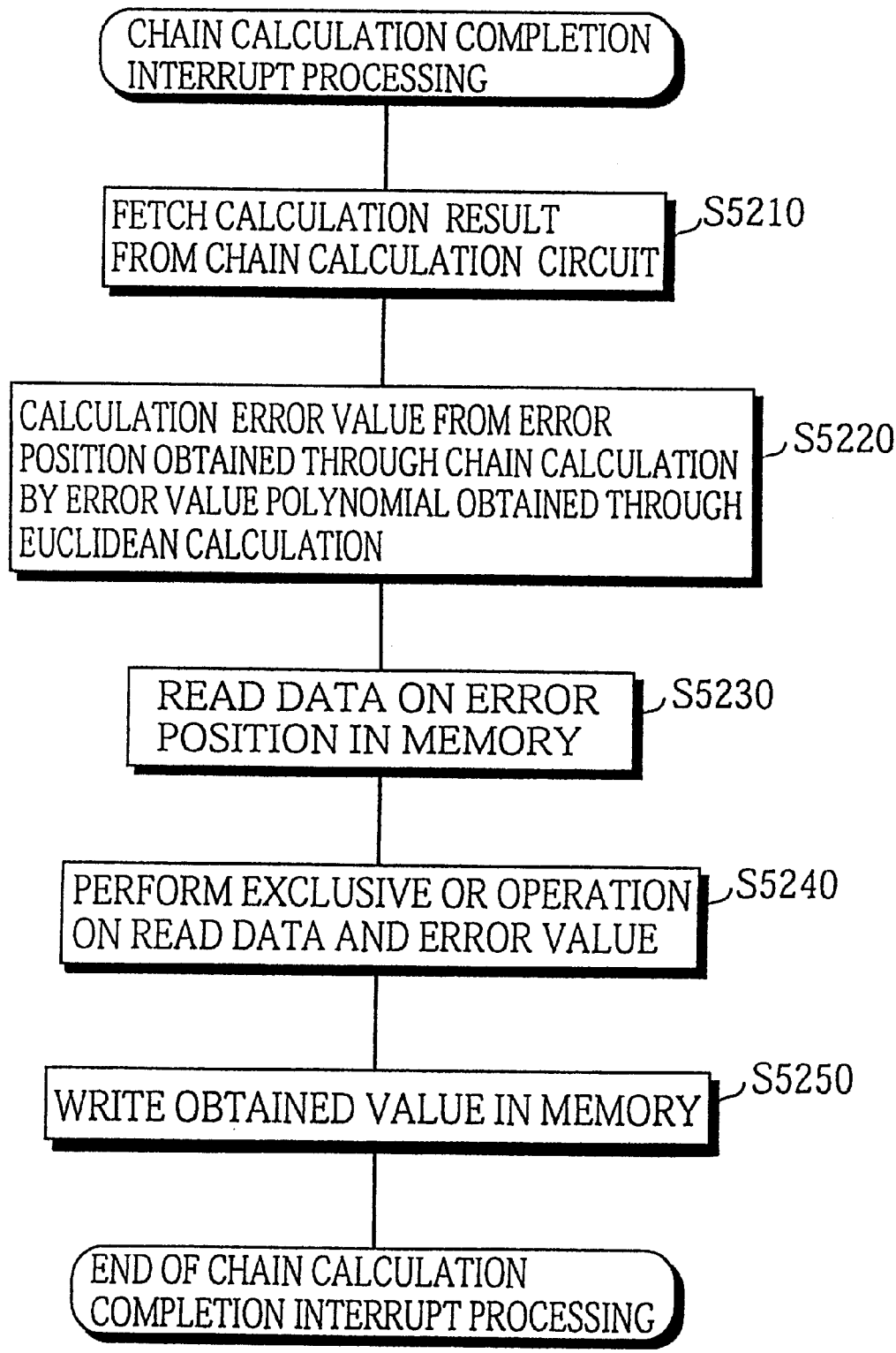
FIG. 22 is a flowchart illustrating a chain calculation completion interrupt processing.

FIG. 22 shows a flowchart illustrating the chain calculation completion interrupt processing.

The chain calculation completion interrupt processing is performed when interrupt reception unit 2161 in the error correction control unit receives an interrupt addressed to CPU 2160 from chain calculation circuit 2150.

On receiving the notice that interrupt reception unit 2161 has received the interrupt, control unit 2162 instructs Euclidean calculation unit 2164 to temporarily stop the operation shown in FIG. 20, and instructs erroneous data correction unit 2168 to perform an erroneous data correction operation.

Erroneous data correction unit 2168 instructs chain calculation result fetch unit 2165 to read the calculation result from chain calculation circuit 2150 (Step S5210).

Erroneous data correction unit 2168 calculates the error value from the error position, that is, the result of the chain calculation and the error value polynomial obtained by Euclidean calculation (Step S5220), and reads the data at the error position in memory 2110 via data input-output unit 2169 (Step S5230). Erroneous data correction unit 2168 performs an exclusive OR operation on the read data and the error value (Step S5240), and writes the newly obtained value at the error position in memory 2110 via data input-output unit 2169 (Step S5250).

When erroneous data correction unit 2168 completes the erroneous data correction operation, control unit 2162 instructs Euclidean calculation unit 2164 to resume the operation shown in FIG. 20.

Figure 23:
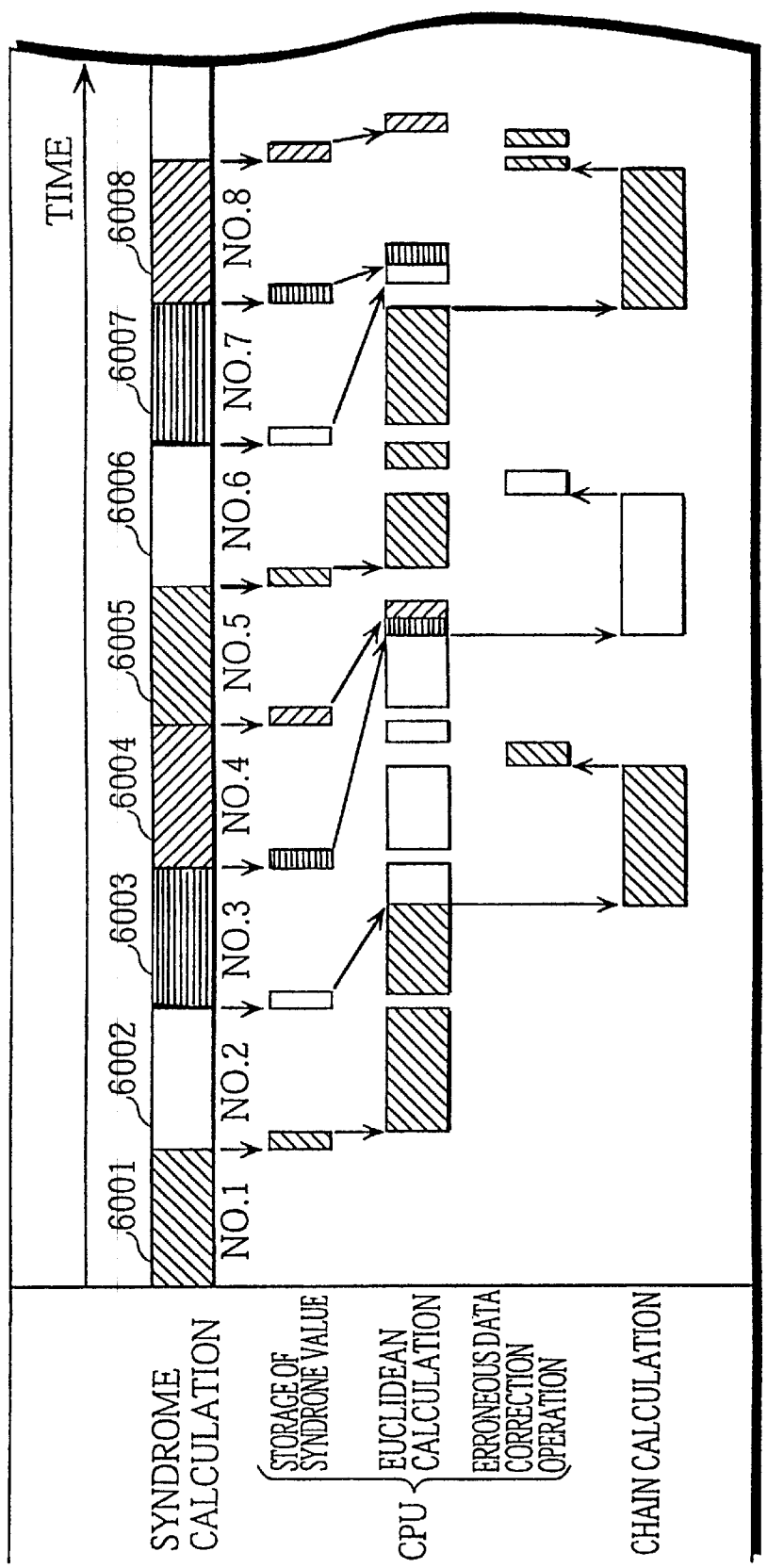
FIG. 23 is the timing of operation by each unit in error correction unit 2101.

FIG. 23 shows the timing of each operation performed by the units in error correction unit 2101; the syndrome calculation performed by syndrome calculation circuit 2140; the storage of the syndrome value, the Euclidean calculation, and the erroneous data correction operation performed by the error correction control unit including CPU 2160; and the chain calculation performed by chain calculation circuit 2150. The storage of the syndrome value shown in FIG. 21 is performed by syndrome calculation result fetch unit 2163. The Euclidean calculation shown in FIG. 20 is performed by Euclidean calculation unit 2164. The erroneous data correction operation shown in FIG. 22 is performed by erroneous data correction unit 2168.

FIG. 23 shows that syndrome calculation circuit 2140, CPU 2160, and chain calculation circuit 2150 perform their operations simultaneously. The storage of the syndrome value, the Euclidean calculation, and the erroneous data correction operation are performed by the same CPU, CPU 2160, so that these three operations are not performed simultaneously.

The following is the explanation of one example of the operation shown in FIG. 23 performed by error correction unit 2101 in accordance with FIGS. 19 to 22.

In FIG. 23 the lines with different patterns illustrate the processing time of different coded data sequences, for instance, different sequences of information data including parity data in C1 direction. The processing time, which is to say, each of processing times 6001 to 6008, to perform a syndrome calculation on each coded data sequence is almost the same.

The data sequences processed in processing times 6001 to 6008 are numbered No. 1 to No. 8.

Syndrome calculation circuit 2140 fetches data sequences No. 1, and performs the syndrome calculation on it. Then syndrome calculation circuit 2140 fetches data sequence No. 2 to perform the syndrome calculation on it. The same is repeated until the syndrome calculation is performed on sequence No. 8. FIG. 23 shows that the syndrome values of data sequences No. 1, No. 2, and No. 5 according to the calculation by syndrome calculation circuit 2140 are not "0".

Focusing on data sequence No. 1, data sequence No. 1 is transferred in a DMA transfer by the second channel (cf. FIGS. 9, 15, and 17) from memory 2110 to syndrome calculation circuit 2140. While receiving the data, syndrome calculation circuit 2140 performs the syndrome calculation on the data, so that the syndrome calculation is completed at almost the same time as the DMA transfer by the second channel. Consequently, on receiving the interrupt that indicates the completion of the DMA transfer by the second channel, the error correction control unit including CPU 2160 judges that the syndrome calculation on the data is completed.

When interrupt reception unit 2161 receives the interrupt that indicates the completion of the DMA transfer by the second channel, syndrome calculation result fetch unit 2163 fetches the syndrome value of data sequence No. 1 from syndrome calculation circuit 2140 under the control of control unit 2162 (Step S5110), and stores the syndrome value in syndrome calculation result storage queue area 2166 in data RAM 2180 (Step S5120). At the last step of the syndrome calculation, syndrome calculation circuit 2140 stores the calculation result in its internal buffer from which syndrome calculation result fetch unit 2163 fetches the syndrome value. In the internal buffer, the newly calculated syndrome value for the next data sequence is overwritten over the previously calculated value only after the syndrome value of the previous data sequence has been fetched.

Euclidean calculation unit 2164 starts its operation only after the syndrome value is stored in syndrome calculation result storage queue area 2166 (Step S5010). When the syndrome value of data sequence No. 1 has been stored in syndrome calculation result storage queue area 2166, Euclidean calculation unit 2164 starts its operation, and checks whether the syndrome value is "0" (Steps S5020 and S5030). In the case of data sequence No. 1, the syndrome value is not "0", then a Euclidean calculation is performed (Step S5040).

While Euclidean calculation unit 2164 performs a Euclidean calculation, syndrome calculation circuit 2140 completes the syndrome calculation on data sequence No. 2. On receiving via interrupt reception unit 2161 an interrupt that indicates the completion of the DMA transfer by the second channel, control unit 2162 interrupts the Euclidean calculation by Euclidean calculation unit 2164 to permit syndrome calculation result fetch unit 2163 to fetch the calculation result from syndrome calculation circuit 2140 (Step S5110). Control unit 2162 stores the syndrome value of data sequence No. 2 in syndrome calculation result storage queue area 2166 (Step S5120), and instructs Euclidean calculation unit 2164 to resume the interrupted Euclidean calculation.

On completing the Euclidean calculation on data sequence No. 1, Euclidean calculation unit 2164 activates chain calculation circuit 2150 via chain calculation activation unit 2167 (Step S5050). Chain calculation circuit 2150 starts the chain calculation on data sequence No. 1.

When Euclidean calculation unit 2164 activates chain calculation circuit 2150, the syndrome value of data sequence No. 2 will already be stored in syndrome calculation result storage queue area 2166 (Step S5010). Euclidean calculation unit 2164 reads the syndrome value to check whether the value is "0" (Steps S5020 and S5030). Euclidean calculation unit 2164 finds that the syndrome value of data sequence No. 2 is not "0", and performs the Euclidean calculation (Step S5040).

While Euclidean calculation unit 2164 performs the Euclidean calculation, syndrome calculation circuit 2140 completes the syndrome calculation on data sequence No. 3. On receiving the interrupt that indicates the completion of the DMA transfer by the second channel, control unit 2162 interrupts the Euclidean calculation on data sequence No. 2. Control unit 2162 instructs syndrome calculation result fetch unit 2163 to fetch the calculation result from syndrome calculation circuit 2140 (Step S5110), and stores the syndrome value of data sequence No. 3 in syndrome calculation result storage queue are 2166 (Step S5120). Then control unit 2162 instructs Euclidean calculation unit 2164 to resume the interrupted Euclidean calculation on data sequence No. 2.

While Euclidean calculation unit 2164 performs the Euclidean calculation on data sequence No. 2, chain calculation circuit 2150 completes the chain calculation on data sequence No. 1. Control unit 2162 receives an interrupt from chain calculation circuit 2150 via interrupt reception unit 2161, and interrupts the Euclidean calculation on data sequence No. 2 to have erroneous data correction unit 2168 perform an erroneous data correction operation.

Erroneous data correction unit 2168 fetches the result of the chain calculation on data sequence No. 1 via chain calculation result fetch unit 2165 (Step S5210), and calculates the error value (Step S5220). Erroneous data correction unit 2168 accesses memory 2110 to correct the erroneous data included in data sequence No. 1 (Steps S5230, S5240, and S5250).

After erroneous data correction unit 2168 completes the erroneous data correction operation, control unit 2162 instructs Euclidean calculation unit 2164 to resume the interrupted Euclidean calculation on data sequence No. 2.

When syndrome calculation circuit 2140 completes the syndrome calculation on data sequence No. 4, the error correction control unit interrupts the Euclidean calculation performed on data sequence No. 2 as mentioned above to store the syndrome value of data sequence No. 4 in syndrome calculation result storage queue area 2166. After that the error correction control unit resumes the interrupted Euclidean calculation on data sequence No. 2.

On completing the Euclidean calculation on data sequence No. 2, Euclidean calculation unit 2164 activates chain calculation circuit 2150 (Step S5050). Chain calculation circuit 2150 starts the chain calculation on data sequence No. 2.

When Euclidean calculation unit 2164 activates chain calculation circuit 2150, the syndrome values of data sequences No. 3 and No. 4 will already be stored in syndrome calculation result storage queue area 2166 (Step S5010). Euclidean calculation unit 2164 fetches the syndrome value of data sequence No. 3, which was stored before that of data sequence No. 4, and checks whether the value is "0" (Steps S5020 and S5030).

On finding that the syndrome value of data sequence No. 3 is "0", Euclidean calculation unit 2164 performs no Euclidean calculation, and fetches the syndrome value of data sequence No. 4 to check whether the value is "0" (Steps S5010, S5020, and S5030).

Euclidean calculation unit 2164 finds that the syndrome value of data sequence No. 4 is also "0", so that no Euclidean calculation is performed. Euclidean calculation unit 2164 waits for another syndrome value to be newly stored in syndrome calculation result storage queue area 2166 (Step S5010).

Error correction unit 2101 will repeat the same operation on the other data sequences.

As mentioned above, error correction unit 2101 has a construction in which the syndrome calculation and other processes are performed simultaneously. Under the control of error correction unit 2101, the calculation results of a data sequence is stored in the queue after the syndrome calculation so that another operation can be performed on it.

Generally speaking, the length of the time for judging whether the syndrome value is "0" is much shorter than that for performing a Euclidean calculation or an erroneous data correction operation, and the number of the data sequence which have a non-zero syndrome value is much smaller than the number of data sequence with a zero syndrome value. Under these circumstances, when a plurality of data sequences are processed together, the processing of all such sequences by error correction unit 2101 can be completed in approximately the same time as the total time required by the syndrome calculation for all of the sequences.

An optical disc reader has been described as an embodiment of a data input-output device according to the present invention, although the present invention is not limited to this embodiment.

(1) According to the present embodiment, optical disc 1010 is a DVD-ROM, however, it may be a CD-ROM (compact disc read only memory) or another kind of media. Data is input to optical disc control unit 2100 via front end processor 1040, and host computer 1070 receives the data from optical disc control unit 2100 in the present embodiment (ct. FIG. 7). Data may instead be input to optical disc control unit 2100 via any kind of circuit or device, and any kind of circuit or device may receive the data from optical disc control unit 2100. Also disk interface unit 2130 only needs to demodulate the data when the input data has been modulated.

An interface for inputting and outputting data in a data input-output device according to the present invention may be any kind of interface, including a SCSI (small computer system interface). In any case, the data input-output device outputs the input data after performing an operation, for instance, an error correction process. It is possible for the data input-output device to receive information data from a host computer, to add parity data to the information data, and to write the information data and its parity data on a storage medium via a disk interface.

(2) According to the present embodiment, the program performed by CPU 2160 is stored on instruction ROM 2170 in advance, however, the program may be provided from the outside and be stored on data RAM 2180.

(3) According to the present embodiment, the error correction process is performed in C1, C2, and C1 directions. It may instead only be performed once in C1 direction. In the present embodiment, the error-correcting code is a product code. It may instead be another kind of code and the error correcting process may be performed accordingly.

(4) According to the present embodiment, the data transfer between disk interface unit 2130 and memory 2110 has the highest priority, and the data transfer between host interface unit 2190 and memory 2110 has the second highest priority as shown in FIG. 17. As one example, however, the data transfer between host interface unit 2190 and memory 2110 may have the highest priority, and the data transfer between disk interface unit 2130 and memory 2110 may have the second highest priority. The priority of the data transfer may be determined according to the state of the interface, the transmission rate of the data input to the data input-output device, and the transmission rate of the data output from the data input-output device after the operation.

(5) According to the present embodiment, syndrome calculation circuit 2140, chain calculation circuit 2150, and CPU 2160 perform the error correction process, wherein CPU 2160 executes a program. The error correction process, however, may be performed by a different circuit configuration.

For instance, the program may enable CPU 2160 to perform the chain calculation, which is performed by chain calculation circuit in the present embodiment. In this case, the error correction for a plurality of data sequences can be completed in almost the same time as the total time of the syndrome calculations performed on all of the data sequences.

Hardware circuitry may perform the Euclidean calculation. Under these circumstances, two circuits simultaneously perform the syndrome calculation and the operations following the syndrome calculation, and the result of the syndrome calculation is stored in the queue to be used by the circuit that performs the operations following the syndrome calculation. This construction may realize the second object of the present invention of increasing the speed of the error correction process.

CPU 2160 may perform both the syndrome calculation and the chain calculation by executing a program in order to realize the first object of the present invention. This construction, however, does not speed up the error correction process.

Figure 24:
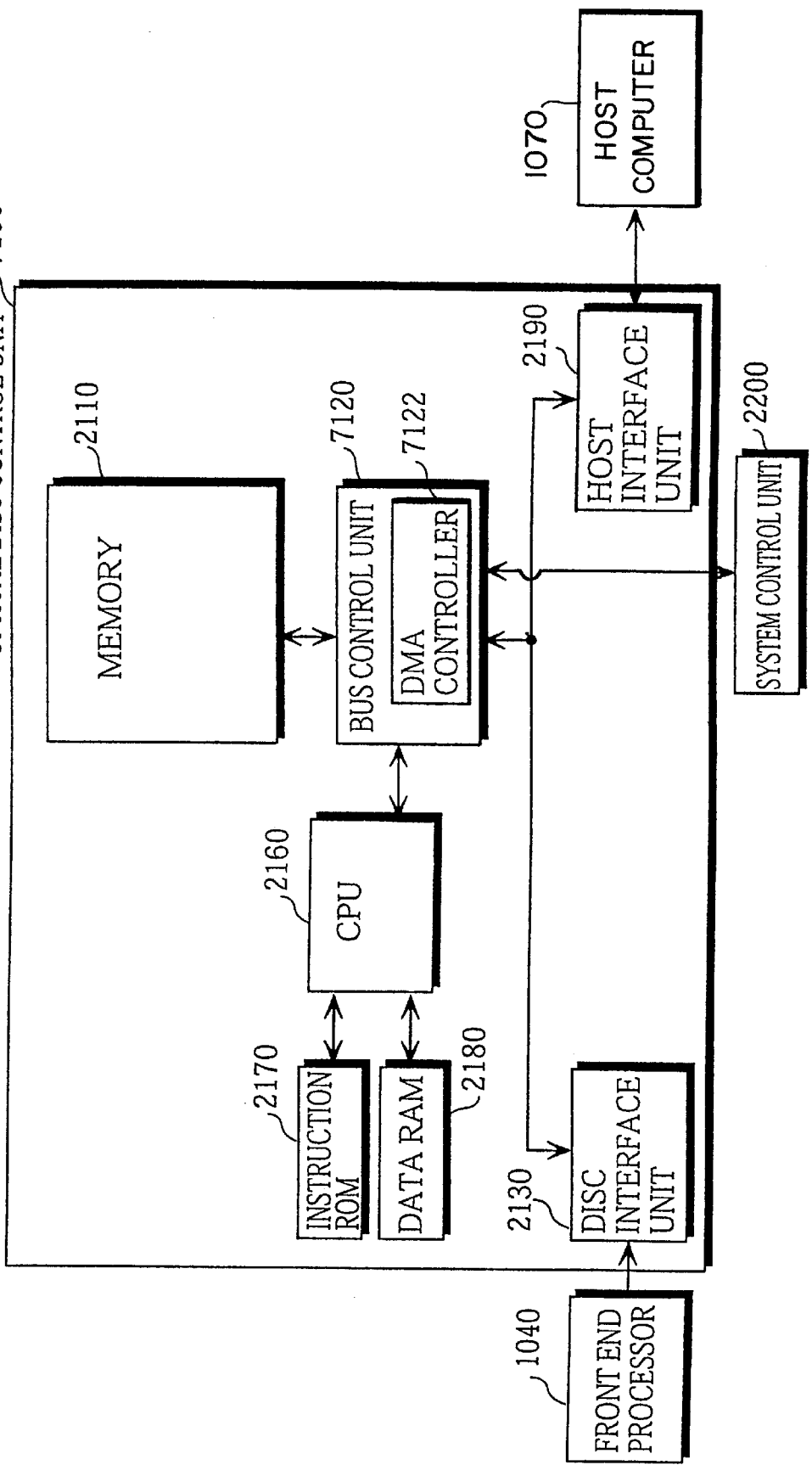
FIG. 24 shows a construction of optical disc control unit 7100 when CPU 2160 performs both of the syndrome calculation and the chain calculation by executing a program.

FIG. 24 shows the construction of optical disc control unit 7100 when CPU 2160 performs both of the syndrome calculation and the chain calculation by executing a program. The construction of optical disc control units 7100 and 2100 are almost the same, with the same components having been given the same reference numbers.

In optical disc control unit 7100, CPU 2160 inputs information in the second channel in DMA controller 7122 so that one block of data is transferred to data RAM 2180 from memory 2110, while CPU 2160 inputs information in the second channel in DMA controller 2122 so that the data is transferred from memory 2110 to syndrome calculation circuit 2140 in the present embodiment. The program to perform the syndrome calculation on the transferred data is stored on instruction ROM 2170 in optical disc control unit 7100. In other words, CPU 2160 in optical disc control unit 7100 instructs the second DMA channel to transfer one block of data from memory 2110 to data RAM 2180 at Step S3050 in the flowchart in FIG. 9, and performs other operations except those at Steps S3090 and S3100. The CPU 2160 performs the operation at Step S3110 only after the error correction in C1, C2, and again C1 directions by means of parity data is completed.

In optical disc control unit 7100, in addition to the operations performed by DMA controller 2122, DMA controller 7122 performs the operation at Step S4110 in the flowchart shown in FIG. 15 every time eight bytes of data is transferred.

Optical disc control unit 7100 shown in FIG. 24, in which instruction ROM 2170 stores a plurality of programs to perform an error correction process on the data that has been coded according to an error-correcting system corresponding to one of the programs, can handle a plurality of error-correcting systems without needing changes to the hardware.

The error correction process may include any operations other than those included in the present embodiment. More specifically, the error position polynomial and the error value polynomial for the error correction process may be calculated by any method other than Euclid's algorithm that is used in the embodiment. The root of the error position polynomial may be calculated by any method other than the chain retrieval.

(6) According to the present embodiment, memory 2110 has a capacity to store up to 15 blocks of data. The minimum capacity of memory 2110 is n×2 byte when the input data is output after operations such as the operations in the error correction process are performed on n bytes of data. Memory 2110 may be included in the data input-output device on the outside of optical disc control unit 2100.

In the present embodiment 38 Kbytes of data is included in one block of data, however, any number of bytes of data may be included in one block.

(7) According to the present embodiment, CPU 2160 refers to the memory management information shown in FIG. 12 and obtains the memory address to be set in DMA controller by a certain calculation. The memory address to be set in the DMA controller may be stored in another way. The conditions of the data stored in memory 2110 may be managed in another way. For instance, CPU 2160 may store, refer to, and update the memory address at which data is to be input, the memory address the data at which is to be corrected, and the memory address the data at which is outputtable.

(8) According to the present embodiment, eight bytes of data is transferred to and from the memory by each DMA transfer after the check of the transfer (cf. FIGS. 14 to 17). Any number of bytes of data may be transferred by each DMA transfer. When the transmission rates in inputting data into disk interface unit 2130 and in outputting data from host interface unit 2190 need to be kept at a certain value, the size of the FIFO memories in disk interface unit 2130 and host interface unit 2190 increases as the data size transferred by each DMA transfer increases.

When one data sequence is not divisible by eight bytes of data, less than eight bytes of data may be transmitted in the final transfer.

(9) According to the present embodiment, syndrome calculation result storage queue area 2166 stores up to 10 sets of syndrome calculation results. The capacity of syndrome calculation result storage queue area 2166 may be determined to be large enough to prevent the queue from overflowing with data, on referring to the time taken to perform the syndrome calculation, the time taken to perform other operations in the error correction process, and the error ratio of the data.

(10) According to the present embodiment, syndrome calculation circuit 2140 includes an internal buffer. The data processing time is described as being controlled so that a newly calculated syndrome value is overwritten over the previously calculated one only after the previously calculated one has been fetched. The internal buffer, however, may be replaced by a FIFO memory, for instance.

(11) The process performed by the error control unit in the present embodiment (the process shown in the flowchart in FIGS. 20 to 22) may be realized by a machine language program recorded on a recording medium for distribution or sale. Such recording medium may be an IC card (integrated circuit card), an optical disc, a floppy disk, or a ROM (read only memory). The machine language program recorded on these media can be used after being installed in general purpose hardware, such as a standard personal computer or an electric appliance that is capable of executing a program. The operations of error correction control unit are performed by executing the installed machine language program.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data input-output device that performs operations on data input from a first device located outside thereof, and outputs the data to a second device located outside thereof comprising:

an input means for continually receiving data from the first device;

an operation means for performing an operation on the data;

an output means for outputting the data to the second device;

a memory for storing the data;

a memory bus for connecting the input means, the operation means, and the output means with the memory;

a first data transfer means for performing first DMA (direct memory access) transfer which transfers the data from the input means to the memory;

a second data transfer means for performing second DMA transfer which, when the first data transfer means has completed the first DMA transfer for a first predetermined amount of data, transfers the data that was stored by the first DMA transfer from an area in the memory to the operation means as the data for the operation;

a third data transfer means for performing third DMA transfer which, when the operation means has completed the operation for the first predetermined amount of data, transfers the data operated on by the operation means from the area in the memory to the output means; and a data transfer control means for performing control so that at any given time, data transfer is performed by only one of the first data transfer means, the second data transfer means, and the third data transfer means, wherein the input means, the operation means, and the output means operate independently in parallel.

2. The data input-output device according to claim 1, wherein when one of the first DMA transfer, the second DMA transfer, and the third DMA transfer becomes necessary for a second predetermined amount of data, the data transfer control means has one of the first data transfer means, the second data transfer means, and the third data transfer means continually transfer the second predetermined amount of data in accordance with which of the first DMA transfer, the second DMA transfer, and the third DMA transfer needs to be performed, and when at least two of the first DMA transfer, the second DMA transfer, and the third DMA transfer become simultaneously necessary, the data transfer control means has one of the first data transfer means, the second data transfer means, and the third data transfer means which needs to perform DMA transfer continually transfer the second predetermined amount of data in accordance with predetermined priority rankings for the first data transfer means, the second data transfer means, and the third data transfer means.

3. The data input-output device according to claim 2, wherein the memory is a dynamic memory, and the second predetermined amount of data is set at a number of bytes so that a formula tv(n+2)<1 is satisfied, in which time taken for memory access per byte is t seconds when DMA transfer is continually performed one of to and from the memory for the second predetermined amount of data, in which an average transfer rate from the first device to the input means is v bytes/second, and in which a number of times the second DMA transfer needs to be performed for a piece of data is n.

4. The data input-output device according to claim 3, wherein the input means includes a first FIFO memory for temporarily storing data received from the first device, the output means includes a second FIFO memory for temporarily storing data to be output to the second device, the first data transfer means transfers data from the first FIFO memory in the input means in the first DMA transfer, the third data transfer means transfers data to the second FIFO memory in the output means in the third DMA transfer, the first DMA transfer becomes necessary when the second predetermined amount of data has been accumulated in the first FIFO memory, and the third DMA transfer becomes necessary when the second predetermined amount of data on which the operation has been performed by the operation means is stored in the memory and the second FIFO memory has enough space to store the second predetermined amount of data.

5. The data input-output device according to claim 4, wherein in the predetermined priority rankings, the first DMA transfer by the first data transfer means has a highest priority, when the first DMA transfer becomes necessary but DMA transfer is already being performed by one of the first data transfer means, the second data transfer means, and the third data transfer means, the data transfer control means has the first data transfer means perform the first DMA transfer only after the presently performed DMA transfer has been completed for the second predetermined amount of data, and when the first DMA transfer becomes necessary but no DMA transfer is being performed by any of the first data transfer means, the second data transfer means, and the third data transfer means, the data transfer control means has the first data transfer means immediately perform the first DMA transfer, and the second predetermined amount of data is set at a number of bytes so that a formula m/v>T is satisfied, in which the first FIFO memory has a capacity of m bytes, in which an average transfer rate from the first device to the input means is v bytes/second, and in which time taken for memory access when DMA transfer is continually performed one of to and from the memory for the second predetermined amount of data is T seconds.

6. The data input-output device according to claim 5, wherein in the predetermined priority rankings, the second DMA transfer by the second data transfer means has a lower priority than the first DMA transfer by the first data transfer means and the third DMA transfer by the third data transfer means, and the data transfer control means has the second data transfer means perform the second DMA transfer only when none of the first DMA transfer and the third DMA transfer is necessary.

7. The data input-output device according to claim 6, wherein the data which the input means receives from the first device includes error correction codes, the operation is an error correction process, the operation means accesses the memory via the second data transfer means to perform the error correction process, and refers to and updates the data stored in the memory according to the error correction codes, and the data transfer control means allows the operation means to access the memory for the error correction process only when none of the first data transfer means, the second data transfer means, and the third data transfer means are performing DMA transfer.

8. The data input-output device according to claim 7, wherein the first device reads data on an optical disc, the optical disc records data which has been coded by calculating a product code for a third predetermined amount of data that is larger than the second predetermined amount of data, and the memory has a capacity to store at least two times the third predetermined bytes of data.

9. The data input-output device according to claim 8, wherein the operation means includes:

a syndrome calculation unit for continually and repeatedly performing a syndrome calculation process in which, on receiving a predetermined fourth amount of data, the syndrome calculation unit calculates a syndrome for the predetermined fourth amount of data;

a syndrome storage queue which has a space for storing a plurality of syndromes;

a syndrome storage unit for storing each syndrome calculated by the syndrome calculation unit in the syndrome storage queue; and a correction unit that, when the syndrome storage queue stores at least one syndrome, fetches one syndrome from the syndrome storage queue, and corrects data corresponding to the fetched syndrome based on the fetched syndrome only when a value of the fetched syndrome is not "0", and wherein the syndrome calculation unit and the correction unit operate in parallel.

10. The data input-output device according to claim 9, wherein the correction unit includes:

a polynomial calculation unit for calculating an error position polynomial and an error value polynomial based on the fetched syndrome;

an error position calculation unit for calculating an error position that is a root of the error position polynomial calculated by the polynomial calculation unit; and a data correction unit for calculating an error value based on the error value polynomial calculated by the polynomial calculation unit and the error position calculated by the error position calculation unit, and for correcting data stored in the memory based on the calculated error value and the error position, and wherein the error position calculation unit and one of the polynomial calculation unit and the data correction unit operate in parallel.

11. An error correction device that continually performs an error correction process on each of a plurality of received words that are block-coded codewords, comprising:

a syndrome calculation means for successively obtaining each of the plurality of received words, and for continually performing a syndrome calculation process in which a syndrome corresponding to a received word is calculated based on the received word;

a syndrome storage queue which has a space for storing a plurality of syndromes;

a syndrome storage means for storing each syndrome calculated by the syndrome calculation means in the syndrome storage queue; and a correction means which, when the syndrome storage queue stores at least one syndrome, fetches one syndrome from the syndrome storage queue, and performs the error correction process on a received word corresponding to the fetched syndrome based on the fetched syndrome only when a value of the fetched syndrome is not "0", wherein the syndrome calculation means and the correction means operate in parallel.

12. The error correction device according to claim 11 further comprising a received word storage means for storing the plurality of received words to be received by the syndrome calculation means, wherein the correction means performs the error correction process by updating a received word stored in the received word storage means.

13. The error correction device according to claim 12, wherein the correction means includes:
- a polynomial calculation means for calculating an error position polynomial and an error value polynomial based on the syndrome;
- an error position calculation means for calculating an error position that is a root of the error position polynomial calculated by the polynomial calculation means; and
- a data correction means for calculating an error value based on the error value polynomial calculated by the polynomial calculation means and the error position calculated by the error position calculation means, and for correcting data included in the received word based on the calculated error value and the error position, and wherein the error position calculation means and one of the polynomial calculation means and the data correction means operate in parallel.

14. A recording medium that records an error correction control program which enables an error correction process to be performed by a computer including a RAM and operating in parallel with a syndrome calculation means that successively obtains a plurality of received words that are block-coded codewords and calculates a syndrome corresponding to a received word based on the received word for each of the plurality of received words, in order to perform continually the error correction process on each of the plurality of receiver words, wherein the error correction control program comprises:
- a syndrome storage step for fetching, when the syndrome calculation means has calculated a syndrome, the syndrome calculated by the syndrome calculation means, and for storing the calculated syndrome in the RAM; and
- a correction step for reading, when the RAM stores at least one syndrome, one syndrome from the RAM, and for correcting a received word corresponding to the read syndrome based on the read syndrome when a value of the read syndrome is not "0".

* * * * *